United States Patent [19]

Rice

[11] Patent Number: 5,628,183
[45] Date of Patent: May 13, 1997

[54] SPLIT STREAM BOILER FOR COMBINED CYCLE POWER PLANTS

[76] Inventor: Ivan G. Rice, P.O. Box 233, Spring, Tex. 77383

[21] Appl. No.: 320,956

[22] Filed: Oct. 12, 1994

[51] Int. Cl.⁶ .................................................. F02C 6/00
[52] U.S. Cl. ........................ 60/39.182; 60/39.04; 122/7 B
[58] Field of Search ........................ 60/39.04, 39.05, 60/39.55, 39.182, 39.07; 122/7 R, 7 B

[56] References Cited

U.S. PATENT DOCUMENTS

| 3,001,513 | 9/1961 | Wolf et al. | 122/7 B |
|---|---|---|---|
| 3,703,807 | 11/1972 | Rice | 60/39.182 |
| 4,315,893 | 2/1982 | McCallister | 60/649 |
| 4,333,310 | 7/1982 | Uram | 60/39.182 |
| 4,785,622 | 11/1988 | Plumley et al. | 60/39.55 |
| 5,109,665 | 5/1992 | Hoizumi et al. | 60/39.182 |
| 5,127,470 | 7/1992 | Inaba et al. | 122/7 R |
| 5,133,180 | 7/1992 | Horner et al. | 60/39.182 |
| 5,365,730 | 11/1994 | Bruckner et al. | 60/39.182 |
| 5,375,410 | 12/1994 | Briesch et al. | 60/39.182 |
| 5,428,950 | 7/1995 | Tomlinson et al. | 60/39.182 |

OTHER PUBLICATIONS

Power, Sep. 1994, By Jason Makansi, Titled: HRSGs, Steam Turbines and Auxiliaries for Combined Cycles.

Primary Examiner—John J. Vrablik
Assistant Examiner—Ted Kim
Attorney, Agent, or Firm—Tobor & Goldstein

[57] ABSTRACT

A process and equipment for generating useful power comprising a special split stream heat recovery boiler 108 in combination with a gas turbine 20 and a steam turbine 80 to form a combined cycle. A steam-injected gas turbine 20 and alternately a condensing steam turbine 116 may be utilized. A topping high temperature and high pressure topping steam turbine 80 optionally may be included. Chemical heat recuperation via natural gas reformation may be incorporated within the boiler 108 to increase cycle efficiency further and to lower NOx formation without excess CO. The heat recovery boiler 206 yields increased efficiency and power output heretofore unexpected for the combined cycle compared to conventional combined cycle equipment.

25 Claims, 16 Drawing Sheets

SPLIT STREAM BOILER FOR COMBINED CYCLE POWER PLANTS

BACKGROUND OF THE INVENTION

1. Field of the Invention

The invention relates to equipment and processes for generating useful power. More particularly, the invention provides a combined gas and steam turbine cycle, wherein a split stream heat recovery boiler is applied to recover heat from a gas turbine exhaust flow.

2. Description of the Prior Art

Aero engines with relatively low exhaust temperatures of from 750° F. to 900° F. do not achieve steam throttle temperatures high enough for the next generation of high-temperature-topping steam turbines. The latest "F" and future "G" technology heavy-duty gas turbines have exhaust temperatures of from 1100° F. to 1160° F. that also are too low for steam throttle temperatures of from 1400° F. to 1500° F. Currently used full exhaust gas stream supplementary firing in front of the boiler tends to lower combined cycle efficiency and thus nullifies potential efficiency gains.

Research and development has been conducted in Europe on higher throttle temperatures and supercritical pressures (boilers and steam turbines) for realizing more efficient conventional steam power plants. In the United States, the Department of Energy (DOE) and the Electric Power Research Institute (EPRI) through the Innovative Steam Technologies/Solar Turbine Inc. (IST/Solar) are pursuing the development of high temperature and high pressure (HT/HP) topping steam turbines (TST) for existing and future conventional all-steam power plants. Parallel work is also being done on the once through boiler (OTB).

The "F" technology gas turbine introduced in the early 1990s fires at 2300° F. and has made the reheat (RH) heat recovery steam generator (HRSG) a reality. Higher combined cycle (CC) efficiency is achieved with this technology. The promise of the "G" turbine that is projected to fire at about 2600° F. offers even higher CC efficiency. A typical 160 MW "F" gas turbine exhausting into a RH HRSG produces a CC efficiency of about 53% (LVH), and the "G" turbine is projected to have a CC efficiency of about 56%. There is a distinct probability that future CC efficiency may exceed 60% by utilizing the concepts of this invention. Supplementary firing the entire exhaust gas stream greatly increases the power output of the overall bottoming portion of the cycle. The very bottom end has a low heat-to-power efficiency conversion level that at most is only 30%. Studies have shown that the higher throttle temperature does not yield a higher overall combined cycle efficiency for reasons to be explained. Therefore, the HT/HP topping steam turbine has not been given serious consideration for combined cycles for either the Aero or heavy duty gas turbines. Conventional CCs generally do not incorporate supplementary firing. However, the conventional all-steam power plants do show a cycle efficiency gain when the HT/HP topping unit is utilized.

The Aero engines with high cycle pressure ratios have low exhaust temperatures by cycle inheritance low exhaust temperatures. Even the new proposed intercooled engines with TITs of 2600° F. and 40 pressure ratios are projected to have exhaust temperature levels of only 850° F. Full exhaust flow supplementary firing does not render markedly increased combined cycle efficiency even when applying a higher temperature topping steam turbine. The steam-injected (STIG) gas turbines have lower exhaust temperatures of about 750° F., and the regenerative cycle gas turbines have even lower exit temperatures (650° F. level). The addition of a HT/HP TST appears impractical. Supplementary firing in front of the HRSG does not offer a viable solution towards higher cycle efficiency.

Supplementary firing the exhaust gas of gas turbines in front of HRSGs has been done for years to increase HRSG output. However, such firing tends to lower CC efficiency. More power is generated but at a lower overall CC efficiency due to the increasing dominance of the lower efficiency of the bottoming part of the cycle. Foster-Pegg in 1982 reported that extensive Westinghouse Electric Corp. studies showed that maximum CC efficiency takes place at a point where an optimum number of drum pressure levels are used—i.e. three stages—to obtain a minimum stack temperature and where no supplementary firing is introduced. General Electric Co. (GE) studies revealed the same peaking phenomena as reported by Tomlinson and Lee in 1985. Because of this optimization point, and since a reduction in CC efficiency occurs with supplementary firing, CC power plants that do not export steam for industrial use do not apply supplementary firing.

Early conceptual work on the chemical recuperated gas turbine CC burning natural gas fuel was performed by Jack Janes of the California Energy Commission (CEC). General Electric Co., under contract to the CEC, made a study of this cycle. In turn, GE was granted a U.S. patent on a portion of the cycle (U.S. Pat. No. 5,133,180, issued Jul. 28, 1992). In this patent, the steam-injected gas turbine CC is used so that the gas turbine exhausts into a combination HRSG and hydrocarbon reformer. A full exhaust flow duct burner (supplementary firing) is positioned in front of the reformer. An excess amount of low efficiency steam is generated in the process, which degrades CC efficiency.

Basic reforming theory is outlined in the '180 patent. The fuel gas as a mixture of natural gas and steam is heated in the presence of a catalyst so that endothermic reaction occurs. The extent of natural gas reforming to produce hydrogen and CO is a function of pressure, temperature and steam/fuel ratio. The latter may be controlled by steam flow to and from the two boiler streams. The proper steam to natural gas ratio for reforming is generally considered to range from 3 to 5 moles of steam to one mole of natural gas. Therefore, 25 to 35% of the total steam produced in a conventional non-supplementary fired gas turbine heat recovery boiler may be used for natural gas fuel reforming. A higher pressure tends to reduce hydrogen production, but a higher temperature will appreciably increase hydrogen production. A reforming temperature of 1300° to 1500° F. will produce far more hydrogen than a 1100° F. temperature, as is well known in the hydrocarbon process industry. Natural gas reformers generally use these higher temperatures. The key to reforming is the catalyst and the temperature. New catalysts could improve reforming at lower temperatures, but so far such catalysts have not been developed.

The hydrogen content is important for reducing the NOx and minimizing the CO, indicative of incomplete combustion. The hydrogen component increases the flame travel speed for improved combustion for low $BTU/Ft^3$ gaseous fuels burning at low flame temperatures. NOx formation is directly proportional to flame temperature. A low $BTU/Ft^3$ value of a mixture of reformed natural gas and steam will burn at a low flame temperature. Very little NOx will be formed, and the CO will also be very low. Combustion tests sponsored by DOE and EPRI have verified this phenomenon. Hydrogen-rich fuel exhibits high flame velocity, combustion stability, wide flammability limits and low luminosity and thus is well suited as a gas turbine fuel.

The '180 patent suggests that the reheat gas turbine is too complicated and costly to consider. Asea Brown Boveri (ABB) has introduced an all new family of reheat gas turbines, the GT-24 and 26 models (60 Hertz 165 and 50 Hertz 230 MWs, respectively). This introduction appears to neutralize the concerns expressed in the '180 patent about complication and cost. These new reheat gas turbines will have a 30 pressure ratio and will exhaust at about 1150° F., which is still too low a temperature for reforming natural gas with a resulting adequate hydrogen content for low NOx and CO combustion. Therefore, the present invention may be advantageously applied to these new reheat gas turbines.

With the appearance of an increasing number of high temperature and high-pressure-ratio gas turbines, steam-injected gas turbines and other types of gas turbines with low and moderate exhaust temperatures; with the development of high temperature and high pressure topping steam turbines and the once through boiler; and with the prospects of developing chemical recuperation equipment for gas turbines, the use of such equipment according to the process and teachings of the present invention becomes technically feasible. The present invention has practical utility for the generation of useful power, such as electrical power, for a number of different gas turbine, boiler and steam turbine arrangements.

SUMMARY OF THE INVENTION

The present invention provided improved processes and equipment for generating useful power by utilizing a combined gas turbine and steam turbine cycle. Either a steam-injected gas turbine or a condensing steam turbine maybe used in combination with heat recovery equipment. A high temperature and high pressure topping steam turbine is optional for the cycle, but is the preferred arrangement. A unique and special split stream boiler is utilized. The gas turbine exhaust gas is split into two separate streams after the gas leaves the gas turbine. One stream is supplementary fired to superheat the total steam generated from both of the gas streams. Less supplementary fuel is required than would be used for supplementary firing the total exhaust gas stream. Useful energy in the exhaust gas is recovered to produce additional power through the generation of steam. An overall lower heat rate is realized that was not utilized in conventional combined cycle equipment.

The gas turbine exhaust flow is thus split to form two separate streams. One of the streams is supplementary fired with a fuel to raise its gas stream temperature to a higher temperature level for highly superheating steam generated from both exhaust streams. The supplementary fired gas stream exits the combined superheater section at a temperature level about the same as that of the gas turbine exhaust. The combined production of steam is thus limited over what would be produced in a conventional full exhaust stream supplementary fired boiler. The gas flow downstream of the superheater generates steam at the same pressure level as that of the other stream. A means of controlling the stream flow and the increased pressure drop caused by the superheater is provided.

The highly superheated steam produced by the supplementary fired side stream is expanded in a high temperature and high pressure steam turbine before the steam is either injected into the gas turbine or is fed to a condensing steam turbine. A first steam turbine serves as a topping turbine to produce pure incremental topping power at about 3800 BTU/KwHr. This incremental power output when added to the rest of the power output of the combined cycle raises the overall combined cycle efficiency from 2 to 4 percentage points depending upon steam throttle conditions, the steam turbine arrangement, and the gas turbine cycle selected.

A catalytic hydrocarbon reformer may be incorporated in the supplementary fired gas stream to produce hydrogen ($H_2$) and carbon monoxide (CO) gas. This gas, when burned in the gas turbine, produces low levels of both nitrous oxide (NOx) and CO for low exit atmospheric air pollution. This reformation and heat recovery is generally referred to in the industry as chemical recuperation. Reforming natural gas requires a high reaction temperature of a mixture of steam and natural gas in the presence of a catalyst to produce desired levels of hydrogen. The supplementary fired side stream provides the required temperature level without supplementary firing the total gas turbine exhaust flow. The endothermic reaction heat is again released when the reformed fuel is burned in the gas turbine. The combined cycle efficiency is thus further increased.

This invention may be applied to a variety of different types of gas turbine cycles to increase power output and cycle efficiency. Some of these different gas turbine cycles are: simple, regenerative, intercooled, intercooled regenerative, reheat, intercooled reheat, and the intercooled reheat regenerative cycle. These turbine cycles may incorporate a single shaft, two shafts, or dual or triple spools. The invention may be applied to steam-injected gas turbines also. The invention is equally applicable to the integrated coal gas combined cycle (IGCC).

This present invention offers a split stream boiler applicable to all of the above-mentioned gas turbines, whereby a small portion of the gas turbine exhaust flow is separated from the main stream and is supplementary fired to provide a suitable temperature to superheat the steam to a high level. This bypass gas stream in parallel with the main stream is subsequently used to generate a portion of the total steam flow before final superheat. A topping superheater for the total steam flow is thus formed. The side gas stream may be supplementary fired to 1600° F. without special internal wall insulation and up to a 2500° F. level or even higher with internal insulation (as reported by DOE) for a once through boiler. The differential pressure drops across the two distinct heat transfer paths are optimally controlled, as will be explained. The HT/HP TST split stream boiler system offers a viable technique for increasing combined cycle output and combined cycle efficiency. The system is workable and practical, as will be discussed. The added cost of the HT/HP TST and the split stream boiler as compared to the increase in power and combined cycle efficiency appears to be economically justified.

The split stream boiler concept according to the present invention may be effectively and advantageously applied to fuel gas chemical recuperation, generally referred to in the chemical industry as hydrocarbon reformation. This process may be applied to both the steam-injected version and the condensing steam turbine arrangement of the combined cycle. Hydrocarbon fuels may be reformed into hydrogen and carbon monoxide, but natural gas (mostly methane in composition) is of particular interest because a large amount of combined cycle equipment has recently been installed around the world that burns natural gas fuel. When burned in gas turbines, the reformed gas will produce far less NOx, as will be explained. The SSB configuration will increase overall cycle efficiency and power output. A HT/HP TST may be utilized as an option to increase cycle efficiency and power output further.

The SSB arrangement according to the present invention takes the cycle one step further than that disclosed in the '180 patent. Only a portion of the gas turbine exhaust flow is ducted to a supplementary fired combined steam superheater and steam/natural gas heater and reformer. The other portion of the exhaust flow generates injection steam or steam to a condensing steam turbine by a separate lower temperature flow path. Injection or condensing steam production is thus limited.

Natural gas and water may be introduced separately or as a mixture at the cold end of the SSB economizer. The gas turbine exhaust side stream boils the water into steam and heats the natural gas in parallel or as a mixture. Gas turbine exhaust heat is recovered, and this heat (excluding the steam latent heat), as well as the endothermic reforming heat, is released when the reformed fuel is burned in the gas turbine. The recuperation efficiency is thus very high, and this heat recovery will increase combined cycle efficiency as well as reduce NOx formation.

The heated steam and natural gas mixture is then superheated to a high temperature up to 1500° F. in the presence of a catalyst. The gas turbine exhaust side stream may be supplementary fired to a temperature level of 2500° F. if need be, as previously discussed, to reduce the side stream flow. The steam produced from the other portion of the gas turbine exhaust flow is likewise superheated to any desired temperature level in parallel with the reformed natural gas and steam mixture. This steam may be optionally heated up to 1500° F. and then fed to the HT/HP TST. However, the injection or condensing steam initially need not be superheated to this high a temperature and may be heated by cooling the 1400° F. to 1500° F. reformed fuel and then be given final superheat, if desired. A more manageable fuel gas temperature to the gas turbine is obtained when considering the required gas valve and gas control valve design and material limitations. The SSB supplementary fired fuel may be natural gas or the reformed fuel, the latter perhaps being preferred to limit NOx formation in the supplementary firing process.

It is the object of the present invention to provide a process for generating steam in a heat recovery split stream boiler to produce additional power at an overall higher combined cycle efficiency than previously known. Applying this apparatus and the process of the present invention increases combined cycle efficiency and power output. A further object of the invention is to provide a supplementary fired superheater for only one of the exhaust gas streams. The total steam generated by the two exhaust streams is superheated by this one fired superheater.

A related object of this invention is to separate the two gas streams utilizing a pressure separation wall installed inside one common boiler enclosure.

Still another object of the invention is to provide a cost-effective heat recovery split stream boiler that may be readily fabricated and either shipped as a package or field erected. One part of the system, the fired superheater, may be shipped separately and placed alongside a conventional heat recovery steam generator wherein steam communicates from the latter to the fired superheater.

A further object of the invention is to provide a heat recovery split stream boiler that is applicable to both a once through boiler or to a more conventional drum-type boiler.

A further object of the invention is to provide a heat recovery boiler that is suitable for either horizontal (vertical gas flow) or vertical heat exchange tubes (horizontal gas flow) with the fired superheater positioned vertically for the former and horizontally for the latter.

A further object of the invention is to provide a heat recovery split stream boiler with horizontal or vertical steam and water heater tubing, wherein space is provided between the tubes for the positioning of an isolation wall for separation of the two streams. In the case of the horizontal heat exchange tubing arrangement, space is provided between the horizontal heat exchange tubes for a vertical isolation wall. Transition ducting and piping are provided to and from the two boilers.

A further object of the invention is to provide for the control of both pressure drop and gas flow of the two gas streams. Dampers either in front or behind the gas streams are contemplated. A preferred arrangement positions an induced draft fan with controllable inlet guide vanes at the cold economizer end of the supplementary fired gas stream. A related object of the invention is to provide a rectangular box-shaped split stream boiler, or an annular-shaped split stream boiler.

A further object of the invention is to include chemical recuperation of a hydrocarbon fuel, preferably natural gas, to produce hydrogen and CO at an elevated temperature for burning the gas turbine wherein low amounts of NOx and CO are exhausted to the atmosphere. Chemical recuperation of the fuel gas will increase combined cycle efficiency according to the present invention.

Still another object of the invention is to provide a system that includes a high temperature and high pressure topping steam turbine to produce incremental topping power at a topping efficiency of about 3800 BTU/KwHr, therein increasing combined cycle efficiency.

Yet another object of the invention is to provide a supplementary fired split stream boiler having fewer burners wherein only part of the gas stream is supplementary fired. Supplementary firing for heating the one exhaust gas stream to about 1600° F. without internal boiler wall insulation is provided, and for heating up to about 2500° F. or higher with internal boiler wall insulation so that both radiant and convection heat transfer may be employed.

Another object of the split stream boiler arrangement of this invention is to minimize the generation of steam to be used for either gas turbine steam injection or condensing steam in a steam turbine where the bottom end heat recovery conversion to power efficiency is low. Only the amount of steam necessary for the exhaust gas heat recovery at the particular gas turbine exhaust temperature encountered is generated.

It is a feature of the invention that the split stream boiler concept may be applied to a variety of different gas turbine cycles.

A significant advantage of the invention is that a split stream boiler concept may be used for the coal gas fuel integrated cycle (IGCC).

These and further objects, features and advantages of the present invention will become apparent from the following description of the construction and operation of this equipment, wherein reference is made to the accompanying drawings forming a part hereof, and wherein like numbers refer to like parts throughout the detailed specification.

DESCRIPTION OF THE PREFERRED EMBODIMENTS

1. Split Stream Boiler for Steam-injected Gas Turbine Combined Cycle

Figure 1:
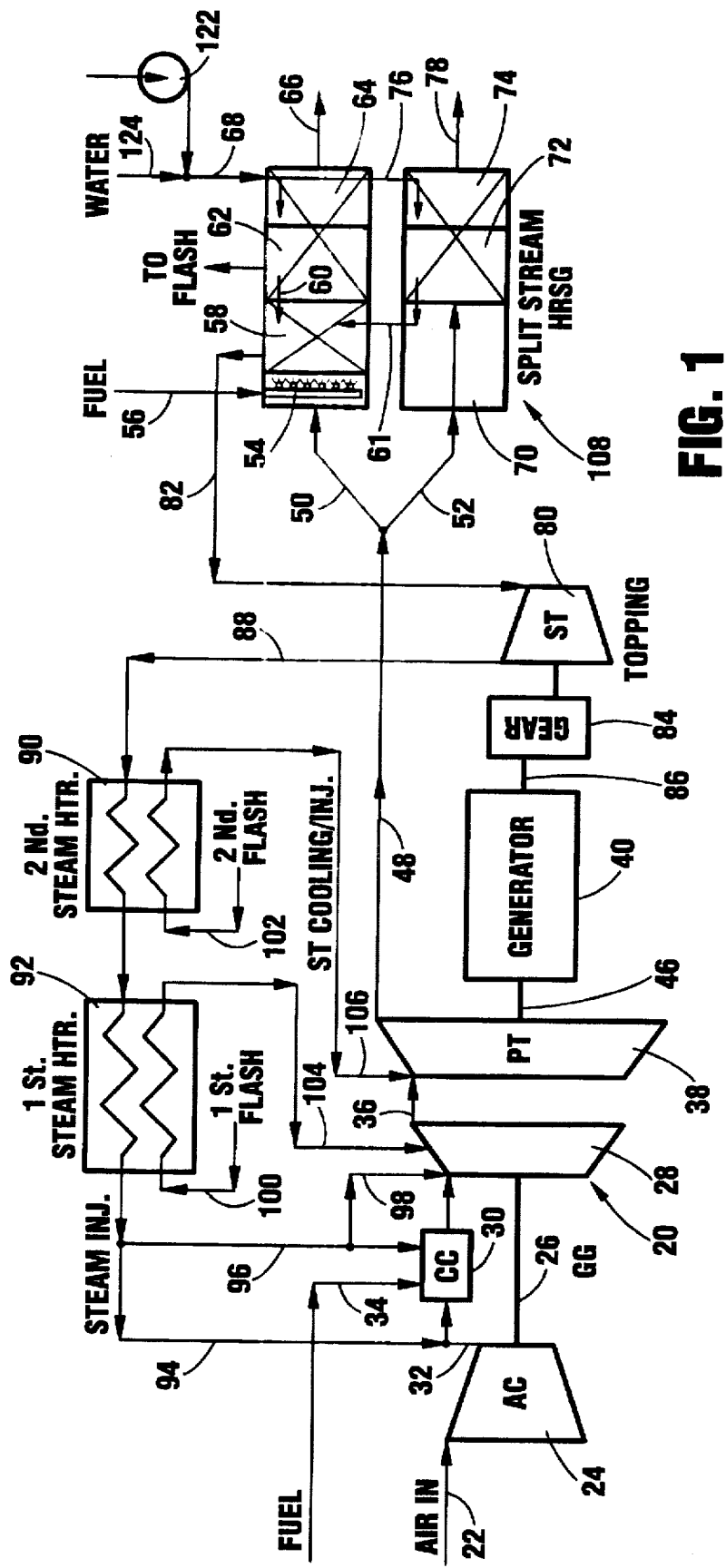
FIG. 1 is a combined cycle schematic flow diagram of a steam-injected gas turbine exhausting into a split stream boiler wherein supplementary fuel is fired in one stream to superheat the total steam flow of both streams before the steam is fed to a topping steam turbine and is subsequently injected into the gas turbine.

A schematic flow diagram of the steam-injected combined cycle according to the present invention shown in FIG. 1 includes gas turbine 20, which receives atmospheric air through inlet duct 22. Turbine 20 produces compressed air by compressor 24, which is driven through shaft 26 by high pressure turbine 28. Turbine 28 in turn is powered by expanding hot gas produced in combustor 30 from air entering combustor 30 through line 32 and fuel entering combustor 30 through fuel line 34. Partially expanded gas discharges from turbine 28 through duct 36 to power turbine 38, which drives electric generator 40 directly by shaft 46. Expanded gas leaves power turbine 38 through exit duct 48 and is thereafter split into two streams, stream X passing into duct 50 and stream Y passing into duct 52.

Exhaust gas stream X from duct 50 passes into and through supplementary firing burner 54 where gas stream X is heated by fuel entering burner 54 through line 56. Heated gas passes through superheater 58 and transfers heat to the steam entering superheater 58 through conduit 60 (for steam flow A) and conduit 61 (for steam flow B). Partially cooled exhaust gas then passes through evaporator and feed water coils 62 and 64, respectively, and discharges through exit duct 66 to the atmosphere. Water is fed to economizer and evaporator sections 62 and 64 through line 68 for generating steam flow A. Gas stream Y passing through duct 52 is fed through duct 70 to evaporator section 72 and economizer section 74, respectively, where heat is transferred to water in evaporator and economizer sections 72 and 74, producing steam generation flow B, which then flows to superheater 58 through line 60. Water is pumped through a boiler feed water pump 122 and feeds economizer section 74 through line 68 and continues through line 76 to economizer section 74. Makeup water enters line 68 through line 124. Cooled gas stream Y discharges from economizer section 74 through exit duct 78 to the atmosphere.

Superheated steam from fired superheater 58 is fed to topping steam turbine 80 through line 82, which drives generator 40 through speed-reducing gear 84 and shaft 86. Partially expanded steam exits topping turbine 80 through line 88 and then passes through steam heater 90 and steam heater 92 before being injected into the compressor discharge line 32 (through line 94) and combustor 30 (through line 96) and turbine 28 (through line 98). Flash water from economizer sections 64 and 74 is fed to flash drums (not shown). Flash steam generated therein enters steam heaters 92 and 90 through lines 100 and 102, and heated steam is injected into turbines 28 and 38 through lines 104 and 106 and expands to produce power and thereafter exhausts to split stream boiler 108 where sensible heat from the steam is recovered. Cooled injection steam exits split stream boiler 108 through exit ducts 66 and 78 along with cooled gas streams X and Y.

Figure 2:
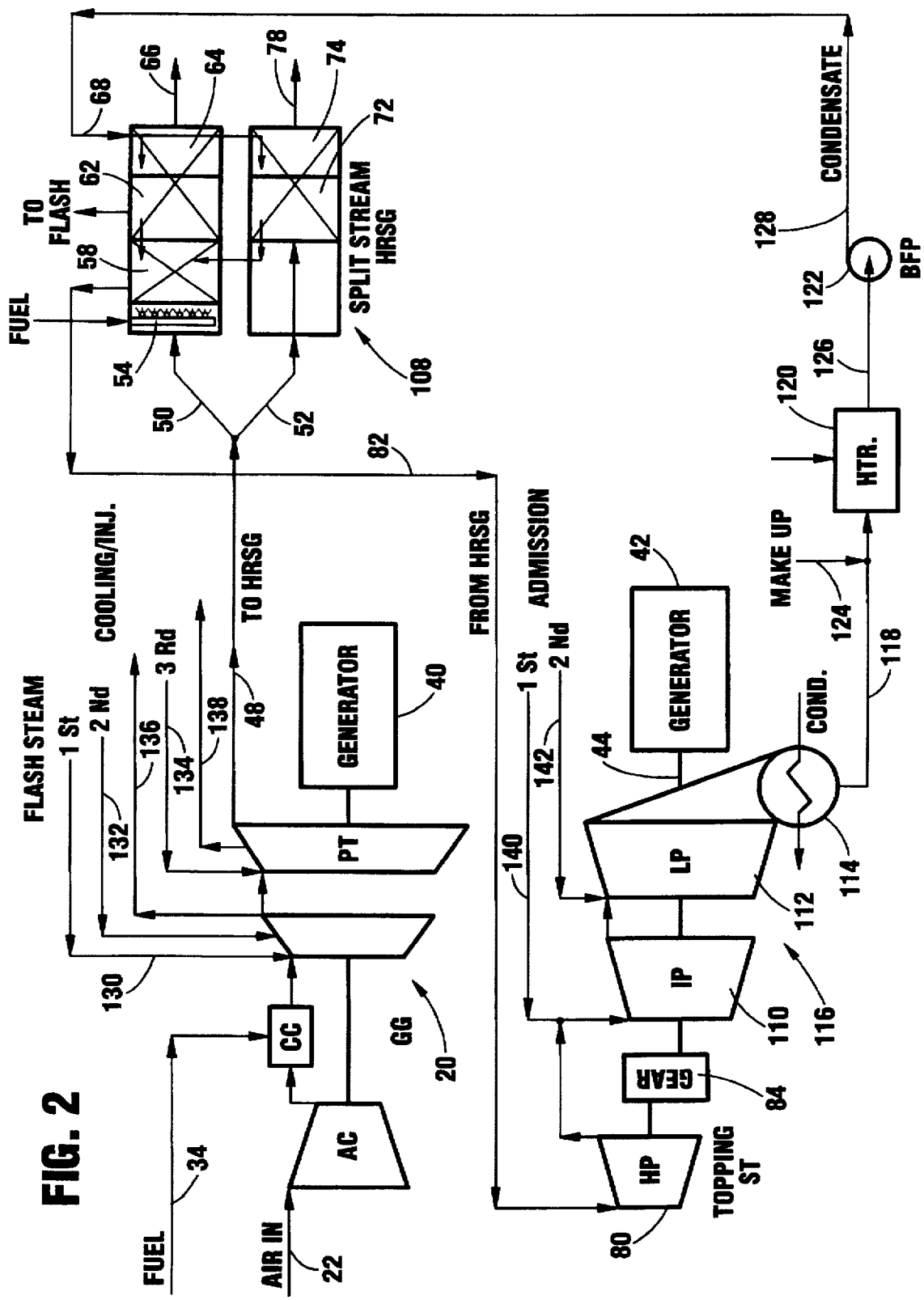
FIG. 2 is a combined cycle schematic flow diagram of a gas turbine exhausting into a split stream boiler wherein supplementary fuel is fired in one stream to superheat the total steam flow of both streams before the steam is fed to a topping steam turbine and is subsequently fed to a condensing steam turbine.

Combined cycles, such as suggested in FIGS. 1 and 2, incorporating steam injection, utilizing a heat recovery steam generator and alternately applying a condensing steam turbine are well known and used extensively throughout the world. However, a significant difference in FIG. 1 is the application of the split stream boiler and the thermodynamics of the interfacing of the superheating function with the topping steam turbine. The low end of the steam bottoming cycle output is kept constant, or nearly so, and the extra heat released by the fuel burned in the supplementary fired superheater with only partial exhaust gas flow is converted to pure topping power. The rest of the steam cycle remains substantially the same. The increment of topping power at about 3800 BTU/KwHr added to the rest of the nearly constant power output of the plant at a much higher heat rate will increase combined cycle efficiency by the ratios of component power outputs and heat rates involved. Supplementary firing the total exhaust gas stream adds too much extra low end power at a low heat to power conversion efficiency of only about 30% (11,400 BTU/KwHr) leading to the advantages and efficiencies disclosed in the present invention. When the gas turbine exhaust temperature is only 800° F., for instance, it is impossible to superheat the steam to even 800° F., let alone 1000° F., without supplementary firing the gas turbine exhaust. By splitting of the exhaust flow stream, only a preselected part of the exhaust steam is fired.

As an example of the operation of the apparatus of FIG. 1 for a typical 50 MW LM 5000 steam-injected gas turbine (STIG), steam enters topping turbine 80 at about 2400 psia and 1400° F., is expanded to produce power and is then exited at about 475 psia and 950° F. for injecting into the gas turbine. About 4.5 MW of incremental topping power at 3800 BTU/KwHr is produced. The 950° F. exit steam superheats the flash steam before injection. The overall combined cycle efficiency calculates to be about three percentage points higher than for the standard STIG unit.

2. Split Stream Boiler for Condensing Steam Turbine Combined Cycle

In FIG. 2, a schematic flow diagram of the condensing steam turbine combined cycle according to the present invention shows gas turbine 20, split stream boiler 108 and a first electric generator 40. Gas turbine 20 and split stream boiler 108 function in the same manner as the gas turbine and split stream boiler described in FIG. 1. High pressure topping steam turbine 80, which receives superheated steam from fired superheater 58 through line 82, expands the steam to produce topping power and thereafter exhaust partially expanded steam to intermediate pressure steam turbine section 110, where the steam is further expanded. Steam is then fed to a low pressure steam turbine section 112, where the steam continues to expand to condensing pressure in condenser 114. Useful power is produced by the expanding steam. The topping steam turbine 80 produces pure incremental topping power at topping efficiency to raise the overall combined cycle efficiency. Topping steam turbine 80 driving through speed-reducing gear 84 and steam turbine 116 is directly connected through common shafting to a second electric generator 42 driven directly by shaft 44.

Condensate from condenser 114 is fed through line 118 to heater 120 and then to boiler feed water pump 122. Water makeup is introduced to line 118 through line 124. Heated condensate is fed to boiler feed water pump 122 through line 126. Boiler feed water pump 122 pumps condensate through line 128 to economizers 64 and 74 by way of inlet line 68. Flash steam is injected into the gas turbine for blade cooling through lines 130, 132 and 134. Return steam after blade cooling is exited through lines 136 and 138 for admission to steam turbine 118 through lines 140 and 142, respectively. A similar gain in combined cycle efficiency of about three percentage points for the non-steam-injected LM 5000 gas turbine is calculated for the STIG LM 5000 when applying the apparatus of FIG. 2.

3. Combined Cycle Maximum Efficiency Optimization

Figure 3:
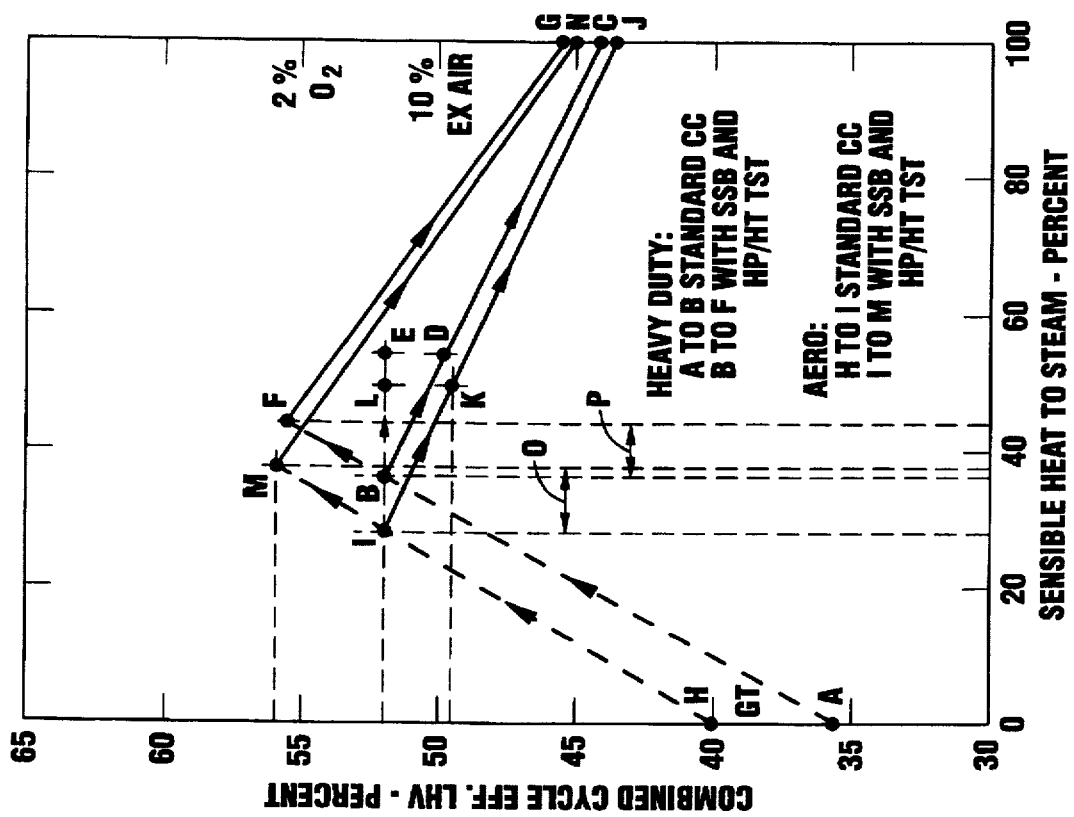
FIG. 3 is a graph of combined cycle efficiency versus sensible heat transferred to steam for present-day "F" technology gas turbines that fire at a temperature level of 2300° F. Points M and F represent efficiency points for the split stream boiler arrangement.

FIG. 3 is a graph of combined cycle efficiency versus sensible heat transferred to steam in a heat recovery boiler for both the latest "F" technology heavy-duty gas turbines and the latest Aero engines. Heat is absorbed by the water and steam from points A or H (as may be the case for simple gas turbine efficiency), to points B and I for a minimum stack temperature. It is recognized by the industry that both the latest Aero engines such as the LM 6000 and the heavy duty "F" machines have approximately the same optimum combined cycle efficiency as shown in FIG. 3. Supplementary firing the full exhaust stream takes place from points B and I to points C and J, where most of the oxygen is consumed down to 2% (10% excess air) as is the case for a conventional power boiler. The combined cycle efficiency falls off to a noticeable extent as shown.

If a high temperature and high pressure topping steam turbine is applied to the supplementary fired boiler, the combined cycle efficiency will rise from points D and K to points E and L. However, very little, if any, gain in combined cycle efficiency takes place over the optimum points of B and I for no supplementary firing. Therefore, the topping steam turbine does not increase combined cycle efficiency, and such firing only increases bottoming power output.

A different scenario takes place when only a portion of the gas turbine exhaust stream is supplementary fired to superheat the total steam flow and where the superheater exit gas temperature is the same as that of the gas turbine exhaust. A noticeable combined cycle efficiency gain takes place. Heat is added as shown by arrows O and P. All of this heat is transferred to the steam to perform the topping superheating function. The combined cycle efficiency will rise to points F and M for each type of machine, respectively. The downstream bottoming portion remains the same. The heat input to the fired superheater is thus converted to pure incremental topping power at about 90% efficiency (3800 BTU/KwHr) when considering radiation heat loss and mechanical (beatings, generator, etc.) losses.

The exact end points, F and M, and the heat input, as represented by arrows O and P, will depend upon the particular topping steam turbine throttle temperature and pressure conditions. The throttle steam, if superheated to 1500° F. instead of 1200° F., for instance, will add more topping power to that of the gas turbine and thus increase combined cycle efficiency to a greater extent. FIG. 3 assumes a 1400° F. superheat temperature.

Figure 4:
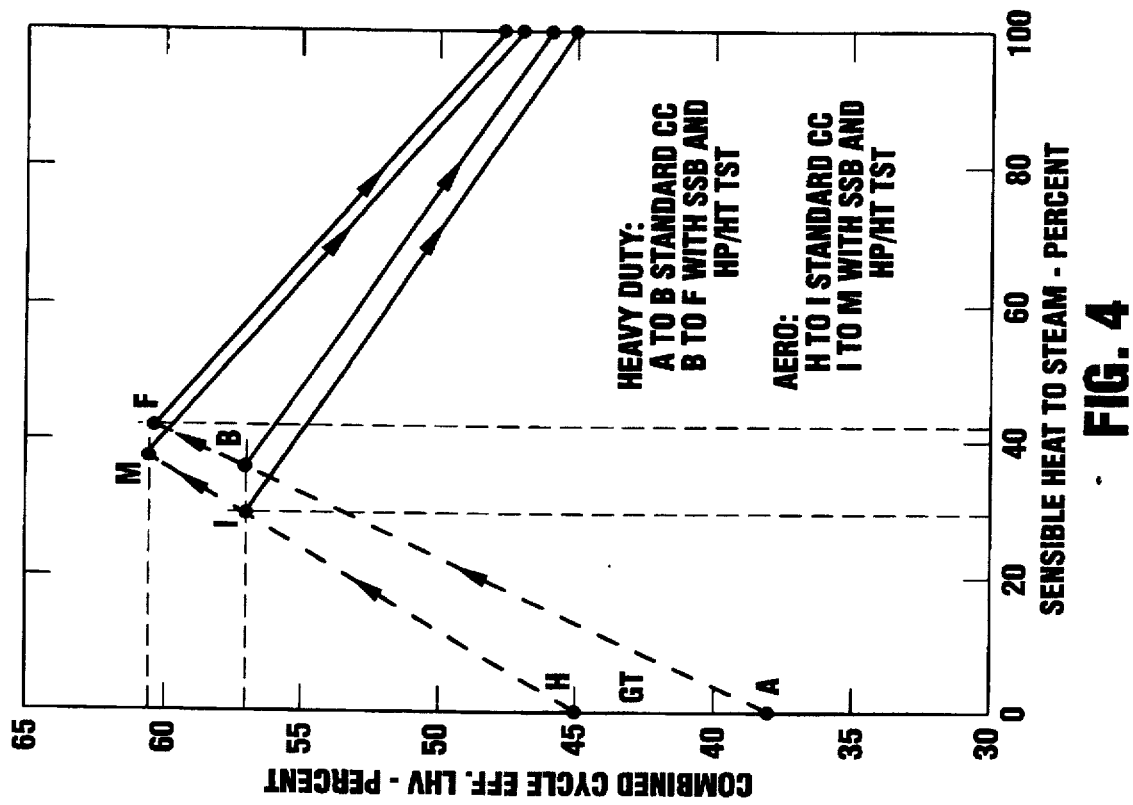
FIG. 4 is a graph of combined cycle efficiency versus sensible heat transferred to steam for future "G" technology gas turbines that are projected to fire at a temperature level of 2600° F. Points M and F represent efficiency points for the split stream boiler arrangement.

FIG. 4 illustrates what may be expected by applying the split stream boiler supplementary firing and a topping steam turbine (1400° F. throttle) to future "G" technology heavy-duty, including proposed intercooled Aero turbines and the reheat Asea Brown Boveri (ABB) GT-24 and 26 models. Both the proposed Aero and the heavy-duty units will have turbine inlet temperatures of about 2600° F. The ABB GT-24 and 26 models fire at about 2300° F. but equate to a 2600° F. simple cycle unit. When supercritical pressure conditions are applied to the high temperature and high pressure topping steam turbine, a combined cycle efficiency over 60% LHV for natural gas fuel is calculated, as represented by points M and F of FIG. 4.

4. Split Stream Boiler Optimization Explanation

Figure 5:
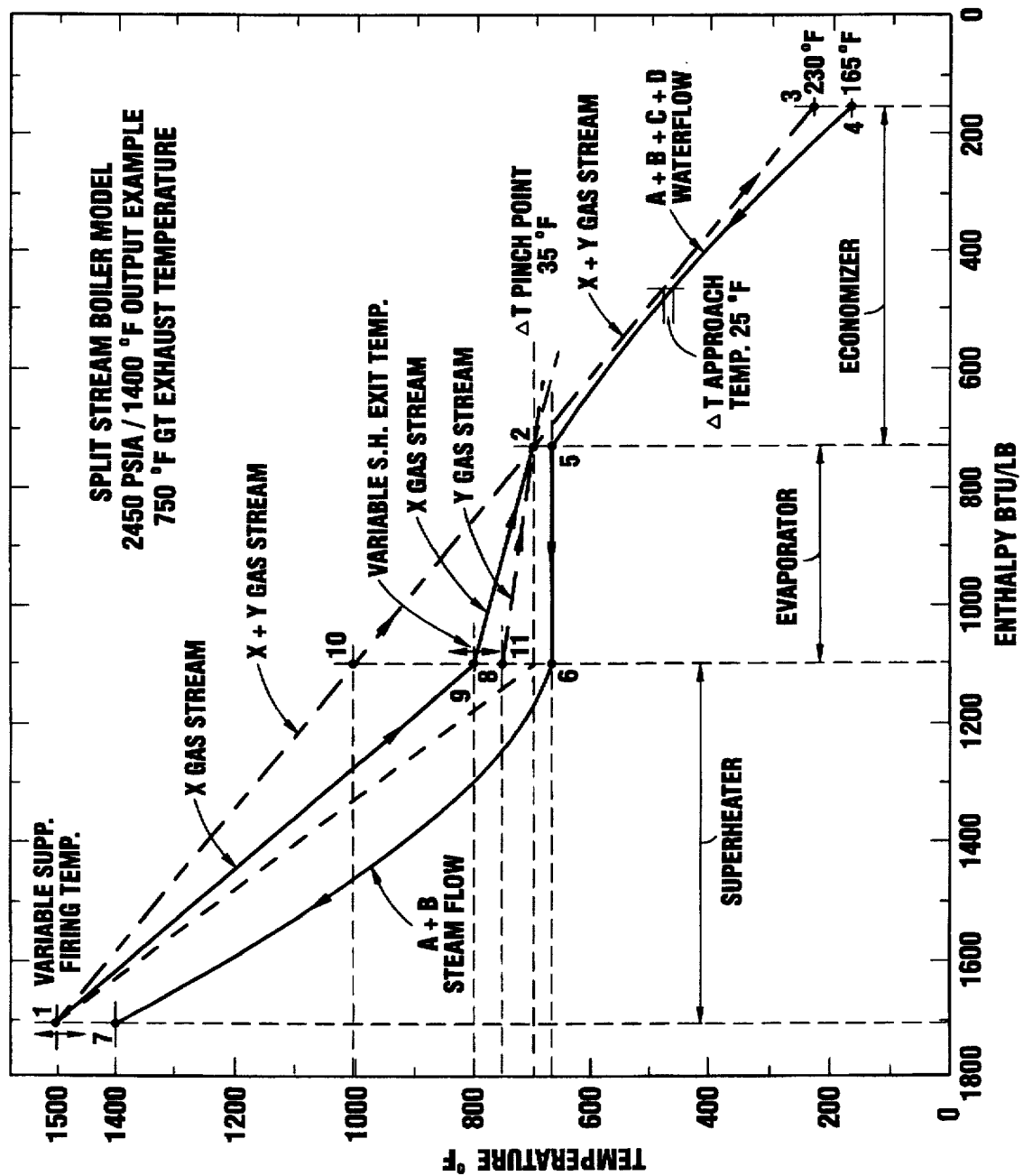
FIG. 5 is a graph of temperature as a formation of enthalpy of a model split stream boiler useful to appreciate how the split stream boiler functions and how the steam is generated by the two gas streams and then superheated by only one gas stream.

FIG. 5 is a plot of temperature versus steam enthalpy that will be used for the present invention as a generalized approach and model to analyze the thermodynamics of split stream boiler 108 system. In this model case, saturated steam is generated at 2450 psia and is then superheated to 1400° F. by the split stream boiler 108 portion of the side stream superheater 58. The gas turbine exhaust temperature is assumed to be 750° F. for a STIG unit. FIG. 5 will serve as a model to show how the split stream boiler operates, how the boiler calculations are made and why a combined cycle efficiency gain takes place.

The split stream boiler 108 is broken down into three distinct sections: the superheater 58, the evaporator sections 62 and 72 and the economizer sections 64 and 74. Heat is output from the gas through streams X and Y via lines 50 and 52. Heat is input to the streams A and B through lines 60 and 61. Heat input and output may be calculated separately, section by section. The bypass gas, stream X, is heated from the gas turbine exhaust temperature of 750° F., point 8, to 1500° F., point 1, by supplementary firing superheater 58. Preferably, a burner within the supplementary fired superheater heats the first gas stream to a temperature of from 1400° F. to 1600° F. This bypass gas is cooled (800° F. in this instant example) from point 1 to point 9. However, this value may be higher or lower and is the designer's choice. The gas turbine exhaust temperature may be cooled to 750° F., or even as low as 700° F. (see point 2 in FIG. 5, the saturation temperature plus the delta pinch point preselected to be 35° F.). The superheater heat transfer surface is sized to accommodate the selections made.

The bypass gas stream X superheats the total steam (stream A plus stream B). Stream A flow is produced by the evaporator section gas stream X, and stream B flow is produced by gas stream Y. An oversized economizer is applied with extra flow capacity (C+D) and added heat transfer surface to cool the gas stream down to the minimum stack temperature. In this example, point 3 is selected to be 230° F. The total feed water is heated from point 4 (165° F.) to point 5 (665° F.). The excess heated feed water (C) at point 5 is fed to a first flash tank (see FIG. 6.) at about 500 psia to produce incremental saturated steam. The flash water (D and E) is cascaded to flash tanks 2 and 3, which each may be at lower pressures to produce incremental saturated steam for injecting into the gas turbine. It may be noted in FIG. 5 that, if there be any other flash flows to consider, the feed water flow for first flash steam flow is represented by water flow C and that the second feed water flow for the second flash steam flow is represented by water flow D. The total additional feed water flow is the sum of these separate flows and may be represented as a single number, flow Q.

The calculation procedure requires iterations. Bypass gas stream X flow is arbitrarily selected along with gas exit temperature, point 9. The two saturated steam flows (A and B) are calculated and added together. A check is made for heat input to the superheater. The bypass gas stream is adjusted, and the saturated steam flows are recalculated. By iteration, a balance is obtained to determine the bypass gas flow. Finally, the economizer section feed water flow is calculated. The flash steam flow values may then be readily calculated.

Reference is again made to FIG. 5. If the total gas stream is supplementary fired to 1500° F. to superheat the steam to 1400° F. (100° F. approach temperature), the gas cooling path would be almost a straight line from point 1 to point 2 and on to point 3, varying only by the change in specific heat of the gas at varying temperature. The split stream boiler 108 arrangement produces a broken line as shown. The savings in fuel is represented by the triangle bounded by points 1, 2 and 9. Accordingly, there is a savings in energy and accordingly a higher heat transfer energy efficiency. The gas stream more closely matches the steam generation, superheating and feed water heating, thereby creating an overall increase in cycle efficiency. More pure topping power is produced for the same amount of gas turbine injection steam or condensing steam.

The above example is for a gas turbine with a rather low exhaust temperature of 750° F. and a high steam pressure of 2450 psia. A lower pressure may also be selected according to the prevailing application conditions. When the gas turbine exhaust temperature is high enough, for instance, above 850° F., some of the superheating may be done before the topping superheater 58. All Westinghouse 501s and GE Frame 7s, as well as many of the Aero engines, fall into this category. Steam reheat may likewise be handled with split stream boiler 108 arrangement.

5. Split Stream Boiler Design Options

Figure 6:
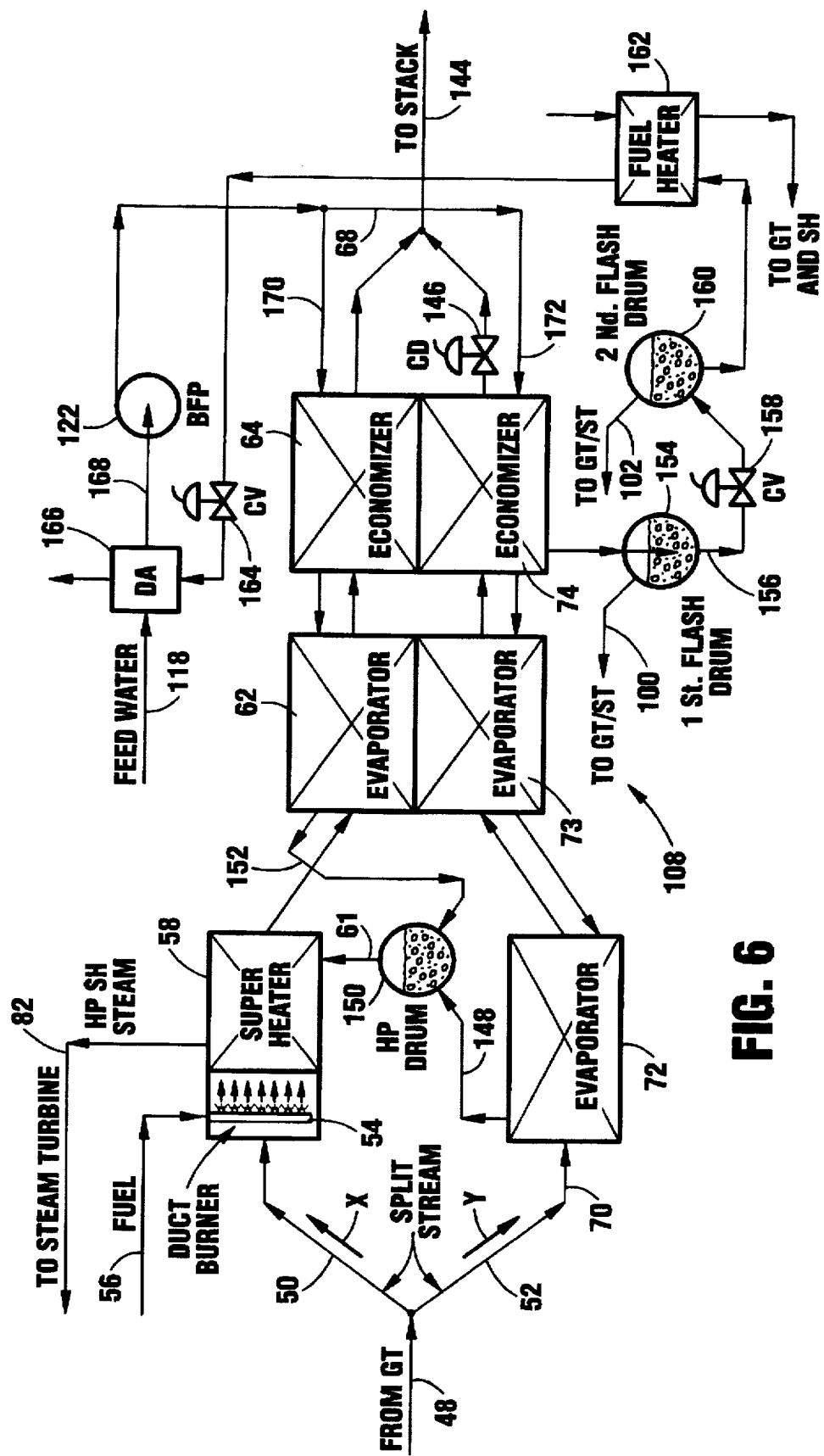
FIG. 6 is a schematic flow diagram of a box-shaped split stream boiler showing the supplementary fired superheater and a pressure and flow control damper located on the non-supplementary fired gas stream exit.

FIG. 6 is a schematic flow diagram of the split stream boiler showing more details than the diagrams of FIGS. 1 and 2. Items have been added to be more complete and assist in understanding the example disclosed with respect to FIG. 5. Gas turbine exhaust stream X is ducted through duct 50 to supplementary fired superheater burner 54 and is fed by fuel from line 56 and through superheater coils of superheater 58. Stream X exits superheater 58 and enters evaporator 62. After passing through economizer 64, stream X finally exits by duct 66 to stack 144. Gas turbine exhaust stream Y is ducted by ducts 52 and 70 to first evaporator section 72, then to second evaporator section 73, and then on through economizer 74 before passing through control damper 146. Control damper 146 automatically controls gas stream X flow by varying the back pressure on evaporator sections 72 ad 73 and economizer 74 (gas stream Y). Control damper 146 could be placed in duct 70, but this location would be on the hot end and could be more costly and less reliable.

Steam generated by evaporator sections 72 and 73 (flow B) is piped through pipe 148 to steam separation drum 150. Steam generated by evaporator 62 (flow A) is likewise piped through pipe 152 to drum 150. Combined steam (flow A and B) is superheated in superheater 58 by fuel burned by duct burner 54. Excess heated feed water exists parallel economizers 64 and 74 to first flash drum 154 where first flash steam leaves drum 154 through pipe 156. Leftover condensate at reduced pressure flows by gravity to pressure control valve 158 and then on to the second lower pressure flash drum 160. Leftover condensate from drum 160 is cooled by gas turbine fuel gas heater 162 before being piped to pressure control valve 164. Feed water enters deaerator 166 along with condensate from pressure control valve 164 and then is piped by pipe 168 to boiler feed water pump 122. Heated and deaerated feed water from pump 122 feeds economizers 64 and 74 through lines 170 and 172. Throttle steam to topping steam turbine 80 exits superheater 58 through line 82. If a once through boiler is applied to split stream boiler arrangement 108, steam separation drum 150 would not be used, and the steam flow from evaporators 62 and 72 would flow directly to superheater 58 through line 61.

Figure 7:
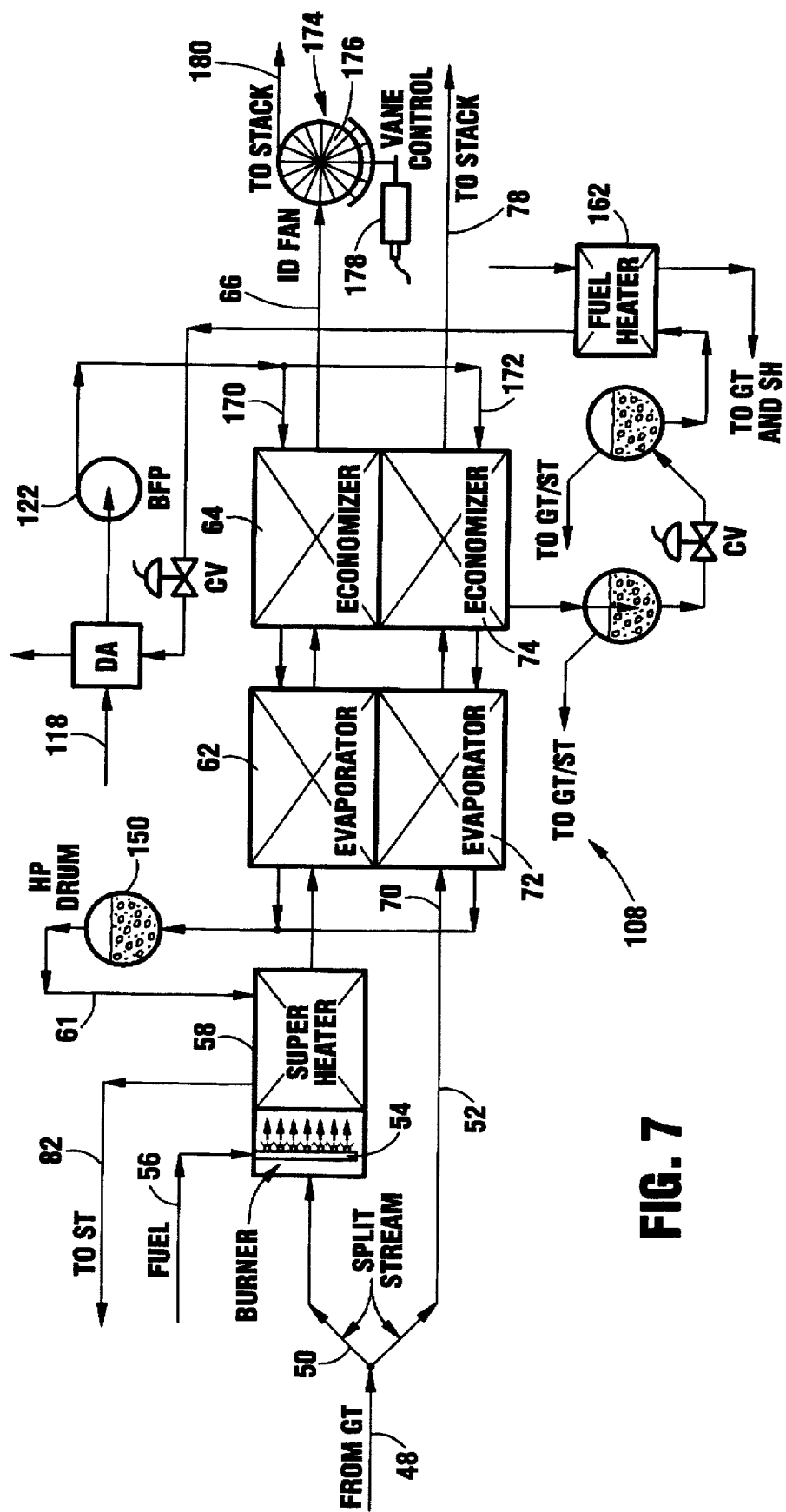
FIG. 7 is a schematic flow diagram of a box-shaped split stream boiler having an induced draft fan with inlet control vanes for pressure and flow control located at the exit of the supplementary fired gas stream.

FIG. 7 shows the preferred arrangement of the split stream boiler 108 for controlling flow and pressure drop of the two gas streams X and Y. The superheater gas path will have a greater pressure drop because of the added burner 54 and superheater 58. One option is to add extra heat exchange surface to the bypass stream X to reduce pressure drop, although this procedure would be costly and difficult to design. Another way to balance the flow of streams X and Y is to place control damper 146 on the discharge side of the non-fired gas stream, as shown in FIG. 6. A similar damper could be placed at the gas turbine exit, on the hot side, although this damper also would be more expensive and potentially troublesome to operate. Dampers may be made to automatically force the correct amount of gas through the burners and superheater, although such dampers will penalize the gas turbine by increasing the back pressure by about 2 to 4 inches of water, i.e., the pressure drop across burner 54 and superheater 58 heat transfer surface. Incremental gas turbine power will thus be lost.

The preferred way to automatically control the flow of the two streams is to place induced draft fan 174 with variable inlet guide vanes 176 on the bypass gas stream X exit after economizer 64, as shown in FIG. 7. Sensors (not shown) connected to controller 178 may sense the burner temperature and final superheat temperature and flow and thus provide input signals to vane controller 178 to control the gas flow. Inlet vanes 176 are modulated to effect this control. Most of the power penalty will be removed such that a partial inverted cycle is formed. Gas stream X passes to the stack through duct 180. Induced draft fan 174 may be driven by an electric motor, and the power requirement will be rather low due to the low pressure shortfall of not more than 2 to 4 inches of water, the low exit stream temperature and the low flow of stream X compared to the total stream flow of streams X and Y.

Figure 8:
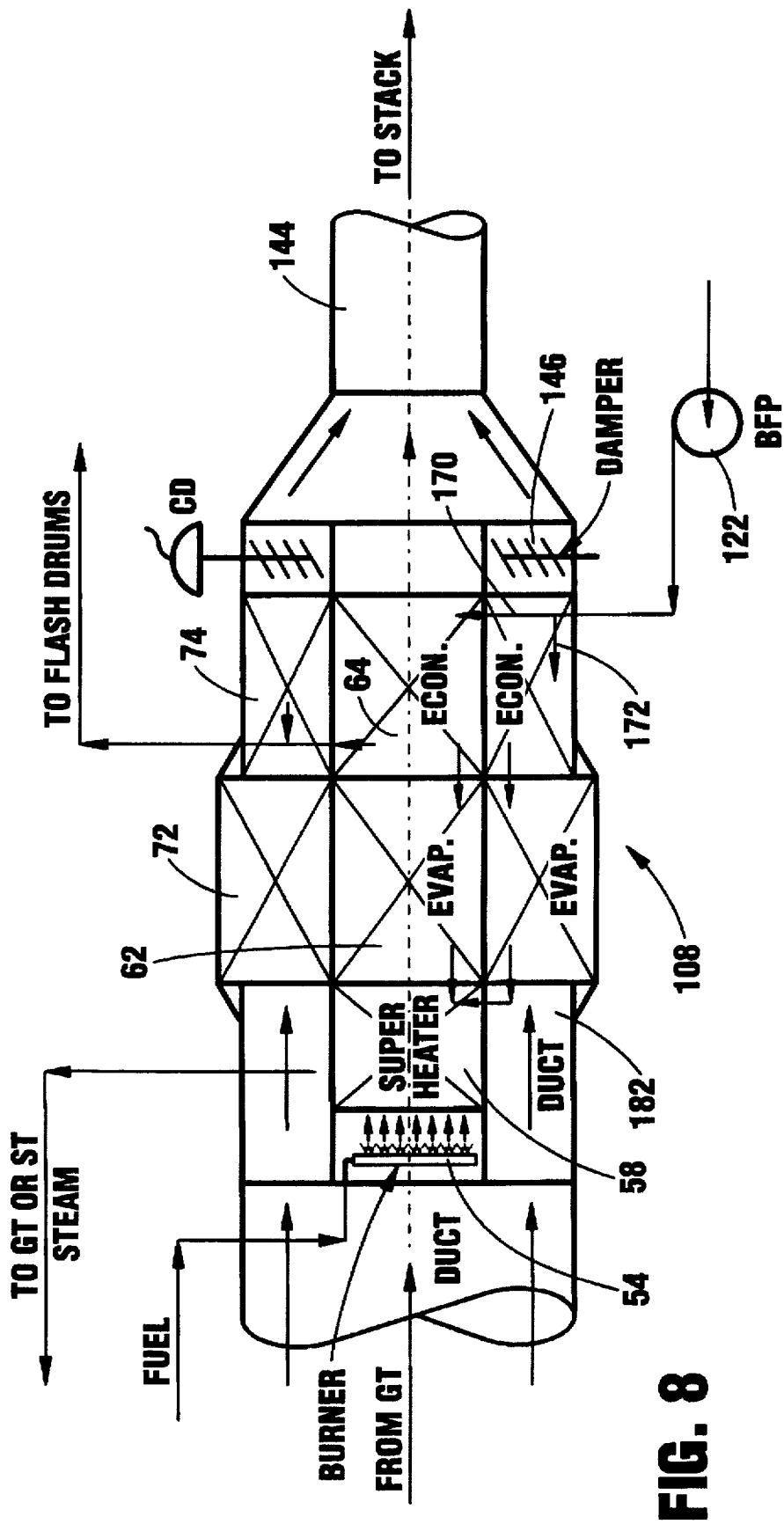
FIG. 8 is a schematic flow diagram of an annular-shaped split stream boiler.

FIG. 8 illustrates another arrangement of the split stream boiler 108 whereby an annular layout is accomplished. The arrangements of FIGS. 6 and 7 suggest rectangular construction with two sets of box-shaped sections placed side by side whereas FIG. 8 shows the various sections arranged in an annular fashion with annular-shaped burner 54 and annular superheater 58 placed in the center of annular duct 182 ahead of annular-shaped evaporator sections 62 and 72, economizer sections 64 and 74, exit damper 146 and discharge duct 144. The individual burners for duct burner 54 may be arranged in a circular fashion to provide even heating to gas stream X. The heat transfer coils of superheater 58, evaporator 62, evaporator 72, economizer 64 and economizer 74 may be spirally wound in a helical-shaped fashion. These tubes may alternately be fed by inlet-ring-type headers and discharged by exit-ring-type headers such that the heat transfer tubes are positioned lengthwise and parallel with the two gas stream flows but for counter flow heat transfer. Note that no steam drums are shown in FIG. 8. This boiler arrangement may be for the once through design with no drums or the conventional drum-type design.

Figure 9:
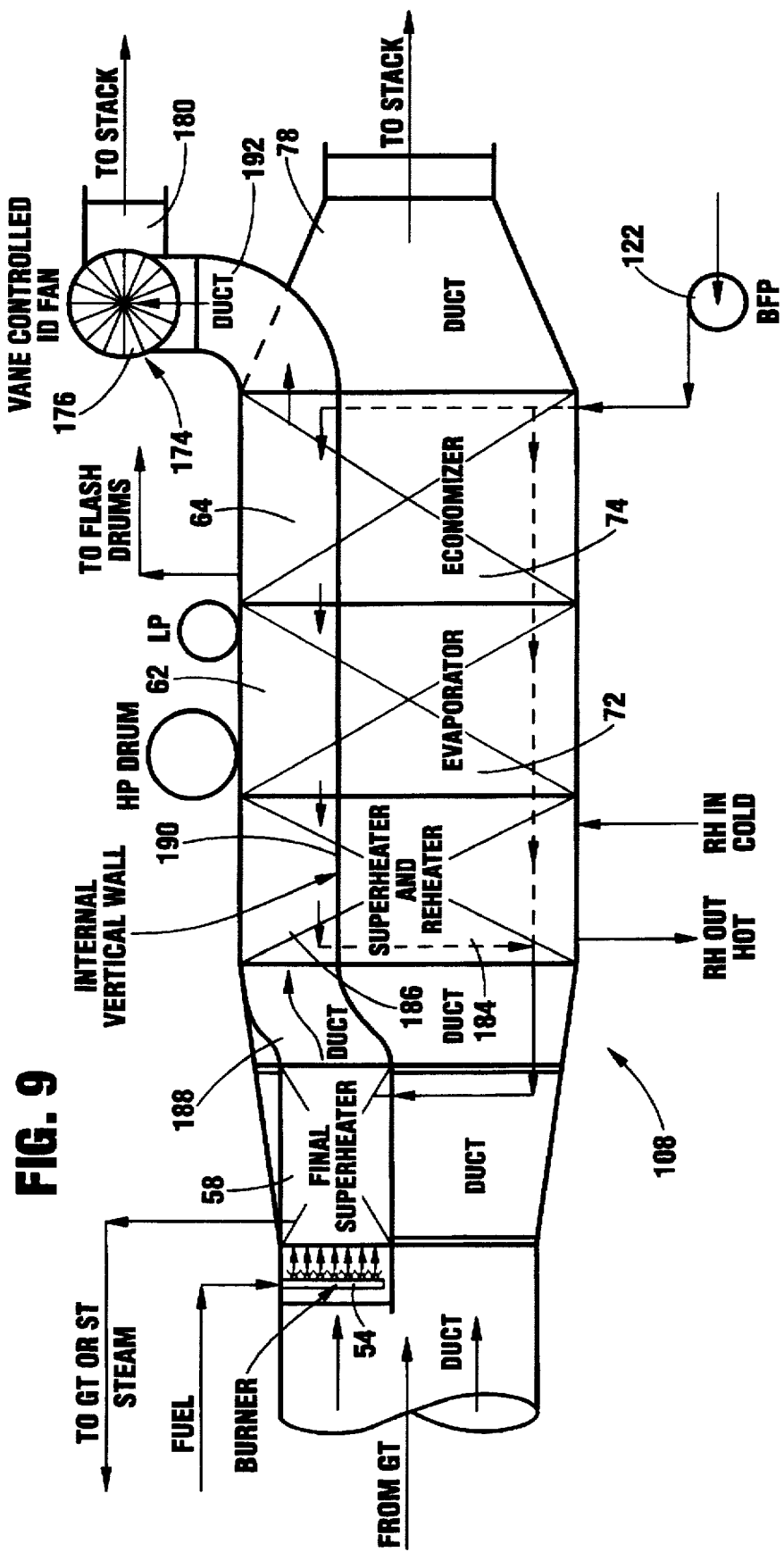
FIG. 9 is a schematic diagram of a box-shaped split stream boiler showing the supplementary burner, ducting to and from the heat exchange sections, the isolation wall, the boiler feed pump, and the boiler drums.

A preferred arrangement of split stream boiler 108 is shown in FIG. 9, where a singular box-shaped arrangement forms an enclosure for the two gas streams. In this arrangement, the steam is partially superheated and fully reheated (for a reheat steam turbine) by heat exchange surfaces located in sections 184 and 186, and final superheat takes place in supplementary fired superheater 58. Duct 188 connects superheater 58 to superheater section 186. Common feed and discharge water and steam headers are located across heat exchanger sections 184 and 186, 62 and 72 and 64 and 74 at the desired locations. A space is provided between the tube bundles of the aforementioned sections at the proper location for placement of isolation wall 190 to separate gas stream X from gas stream Y. The heating and evaporation of the water and the partial superheating of the steam takes place in unison by means of the common headers. The gas temperatures on each side of the wall will be the same, or very nearly so. Both gas stream X and gas stream Y enter superheater sections 184 and 186 at approximately the same temperature in accordance with the design of the heat exchange surface for a preselected gas flow of stream X and a preselected exit temperature out duct burner 54. Gas flow X exits economizer section 64 by way of duct 190 and then to induced draft fan 174. Fan 174 discharges to duct 180, and economizer section 74 discharges to duct 144.

Finned tubes may be positioned vertically or horizontally across split stream boiler 108 and forced circulation employed for horizontal placement. Some European heat recovery boiler manufacturers use this latter approach. The topping superheater in this case would be positioned vertically. A split between tube bundles also may be provided for a vertically upward gas separation wall. In this case, it might be more advantageous to apply dampers to control gas stream flow. The once through boiler may also be applied to the split stream boiler concept. A separate packaged unit may be placed alongside a standard drum-type heat recovery boiler to provide the superheating function. Alternately, a double stream once through boiler may be furnished as a single unit or as a complete package for small size units, or field erected for large units.

The number of supplementary firing burners will be reduced in the split stream boiler compared to the number in a conventionally supplementary fired boiler. Internal wall insulation is not required for gas burner exit temperatures up to about 1600° F. If the burner exit temperature is higher, e.g., up to 2500° F., internal wall insulation will be required for the burner section and the superheater section. Preferably, a burner within the supplementary fired superheater heats the first gas stream to a temperature of from 2400° F. to 2600° F. The higher temperature will increase the temperature differentials between the steam and the gas (stream X), reduce stream X gas flow, reduce the size of the induced draft fan, and make it possible to include a radiant heat transfer surface in the front part of the superheater and thus reduce heat transfer surface area and reduce gas side pressure loss. The overall combined cycle efficiency will be the same in either case as long as the gas temperature out the superheater is the same. The total amount of supplementary fuel burned will be the same provided the split stream boiler superheater exit temperature is the same as the gas turbine exhaust temperature.

Figure 10:
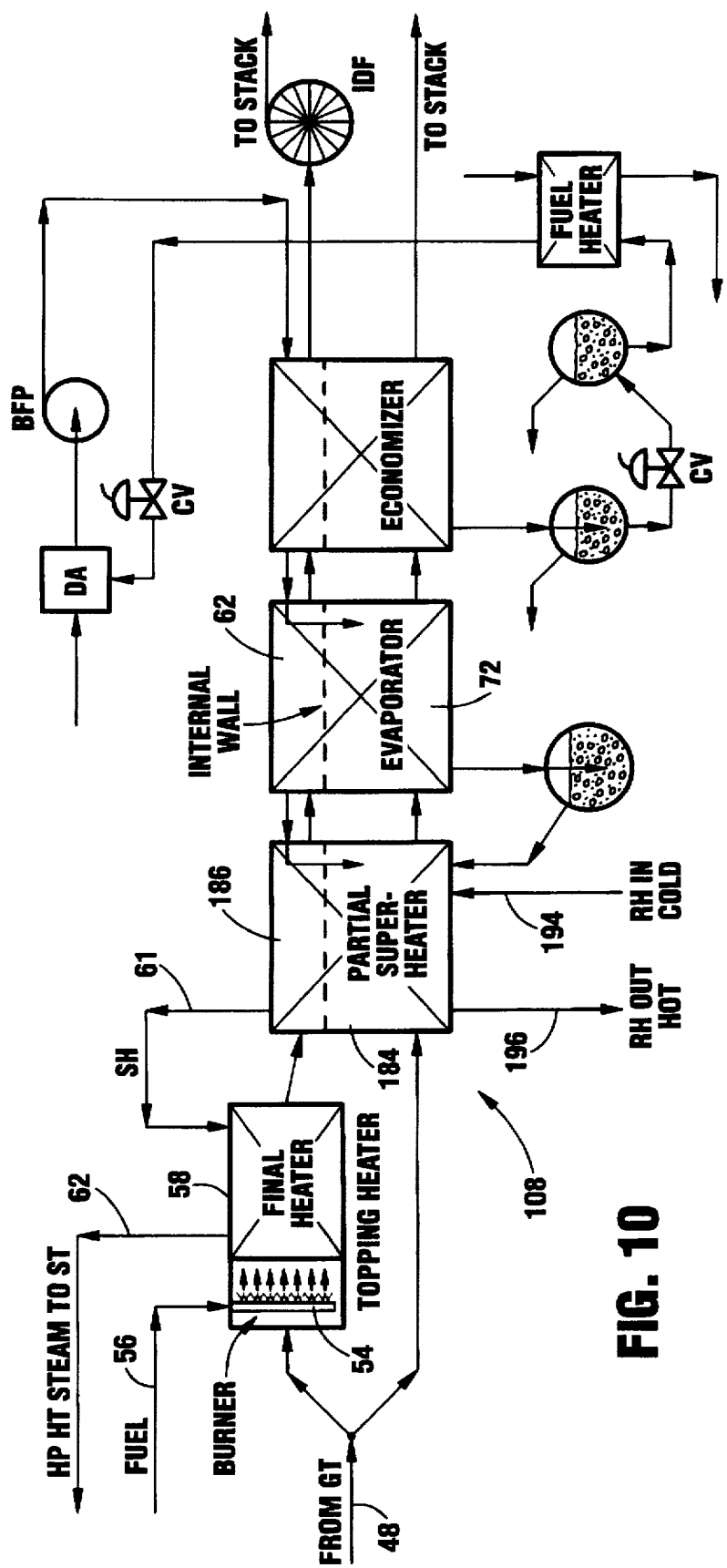
FIG. 10 is a schematic diagram for superheating the steam for a high temperature and high pressure topping steam turbine and reheating for the main steam turbine.
Figure 11:
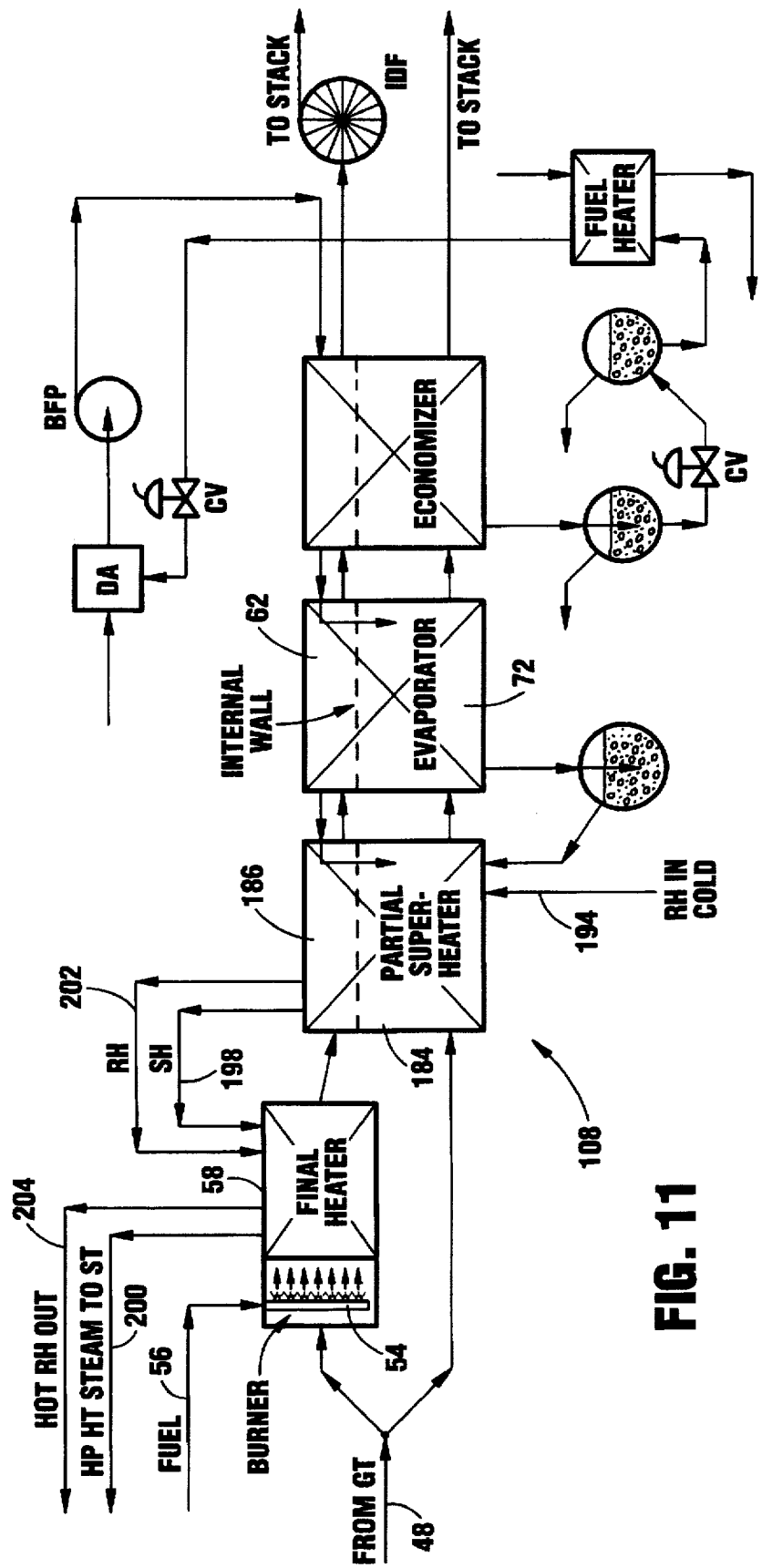
FIG. 11 is a schematic diagram for superheating and reheating in series.

FIGS. 10 and 11 present two schematic flow diagrams that illustrate how the split stream boiler may be applied to heavy-duty gas turbines having exhaust temperatures ranging from 900° to 1150° F. The first example where the split stream boiler 108 may be applied is where the gas turbine exhaust temperature is 900° F. to 1000° F. and where steam is to be superheated for existing-type steam turbines (1000° F. to 1050° F.) and alternately for future high temperature and high pressure topping steam turbines (1400° F. to 1500° F.). In such cases, the steam may be partially superheated by the gas turbine exhaust streams X and Y and then finish superheated by the topping superheater 58 by gas stream X. A second instance where boiler 108 may be effectively applied is for both superheating and reheating by a parallel/series arrangement, e.g., for both conventional reheat steam turbines and alternately for the high temperature and high pressure topping steam turbine 80. Partial superheating and partial reheating are accomplished by gas streams X and Y in parallel (current practice), and final superheating and reheating are done in series by gas stream X by topping superheater 58, but in parallel if need be for the topping steam turbine.

Reference is made to FIG. 10, wherein the schematic flow diagram depicts an arrangement where the steam is first partially superheated by the gas turbine main exhaust flow and is then superheated to the desired high temperature level for topping turbine 80 by the supplementary fired superheater 58 of boiler 108. In FIG. 10, steam is reheated by gas streams X and Y whereby the cold reheat steam enters superheater sections 184 and 186 through line 194 and the hot reheated steam exits through line 196. A maximum amount of topping steam turbine power is obtained, and a minimum amount of low end condensing power is produced to minimize the bottoming end cycle and thus efficiency degradation.

FIG. 11 shows both partial superheating (gas streams X and Y by sections 184 and 186) and final superheating (gas stream X by superheater 58) in series. It is possible to superheat the steam to 1500° F. and then reheat the steam to 1200° F. in this arrangement where the gas turbine exhaust temperature level is 1100° F. ("F" units). Supercritical pressure heat recovery boilers and split stream boilers could be applied. Here the steam entering the condenser would be almost 100% quality (very little moisture). The condensing shock loss would be avoided as well as any harmful corrosion on the last two rows of rotating blades, which are areas of concern by those knowledgeable in the art. This arrangement would appear to be optimum but would require a higher steam volume flow directly to the condenser. For the arrangement as shown in FIG. 11, the partially superheated steam exits sections 184 and 186 through line 198 and is finish superheated by superheater 58 before leaving as initial throttle steam through line 200. The cold reheat steam re-enters superheater sections 184 and 186 through line 194. After partial reheating, steam is piped to the topping superheater 58 through line 202 for finish superheating before being sent back to the steam turbine through exit line 204.

6. Temperature-Enthalpy Diagram Analysis

Figure 12:
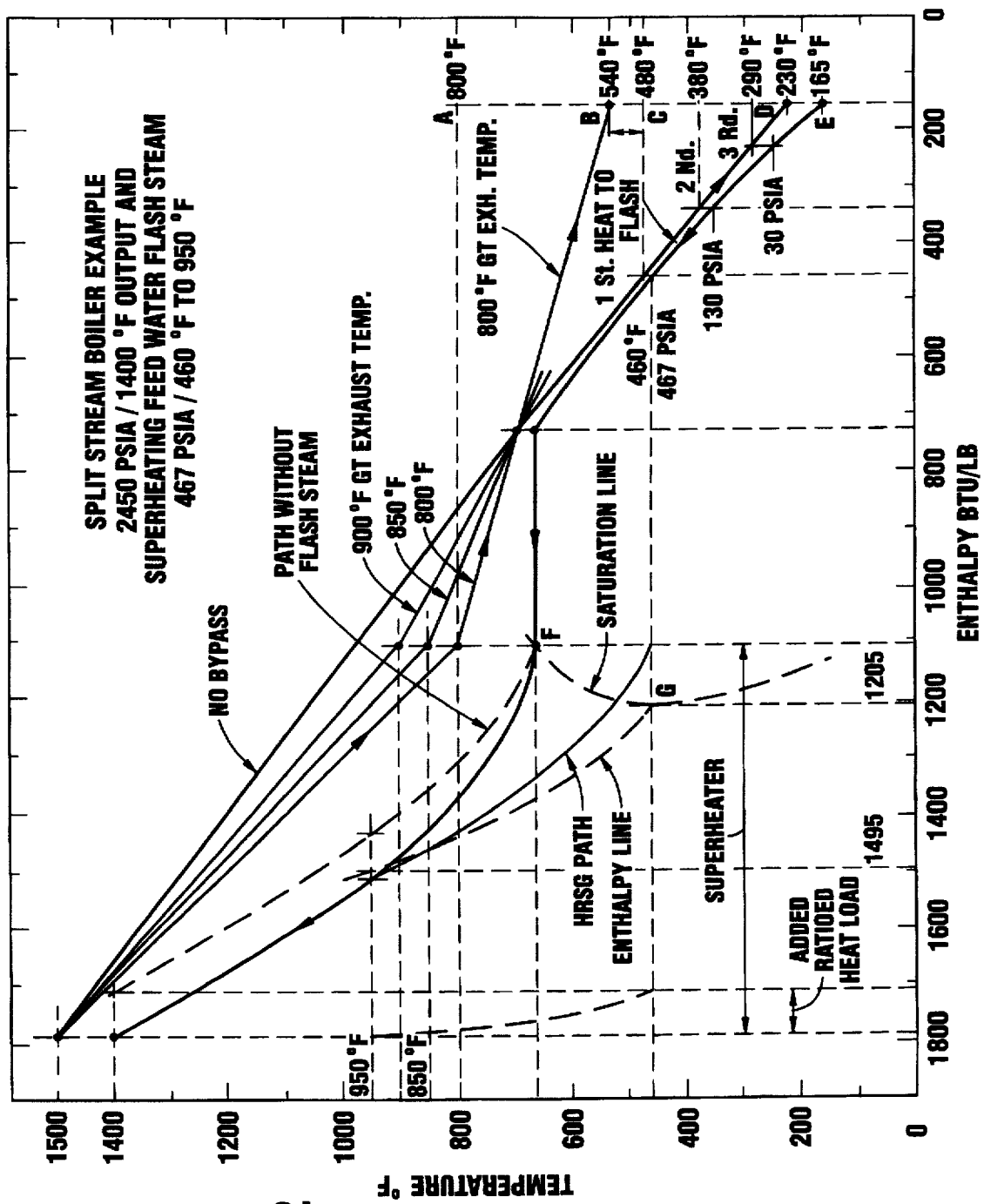
FIG. 12 is a temperature-enthalpy diagram for gas turbines having an exhaust temperature range of 800° to 900° F. and superheating the main steam flow to 1400° F. while superheating the flash steam to 950° F.

In FIG. 12, the split stream boiler is applied to 2450 psia and 1400° F. final steam conditions wherein the feed water flash steam of the first flash drum at 467 psia is superheated from 460° F. to 950° F. An 800° F. gas turbine exhaust temperature is assumed. The ratioed amount of heat for the flash superheater in terms of steam enthalpy is added to the superheater heat load, as shown in FIG. 12, to arrive at the total enthalpy heat load for superheater 58. Calculations are performed as previously explained and referenced to FIG. 5 with the knowledge that the economizer section is treated as a separate entity after calculating steam flows A and B for the superheater 58 and the evaporator sections 62 and 72. Note that the bypass gas stream X may exit superheater 58 at temperatures above the gas turbine exhaust temperature of 800° F. to generate incremental steam in evaporator sections 62 and 72, if need be, for the particular application. Also, the inlet to superheater 58 may be 1500° F., as shown, or any other value up to 2500° F., as previously explained.

Temperature-enthalpy diagrams are used for calculating steam flows for the split stream boiler as opposed to the conventional boiler temperature versus heat method and resulting temperature profile graphs. Care must be taken to equate all steam flows to one pound of steam. Ratioing steam flows and steam enthalpies is necessary for each section: superheater 58, the dual evaporator sections 62 and 73 and the feed water sections 64 and 74. The exhaust gas streams X and Y have, for all practical purposes, straight lines for each boiler section, and only the beginning and end point enthalpies are required.

Figure 13:
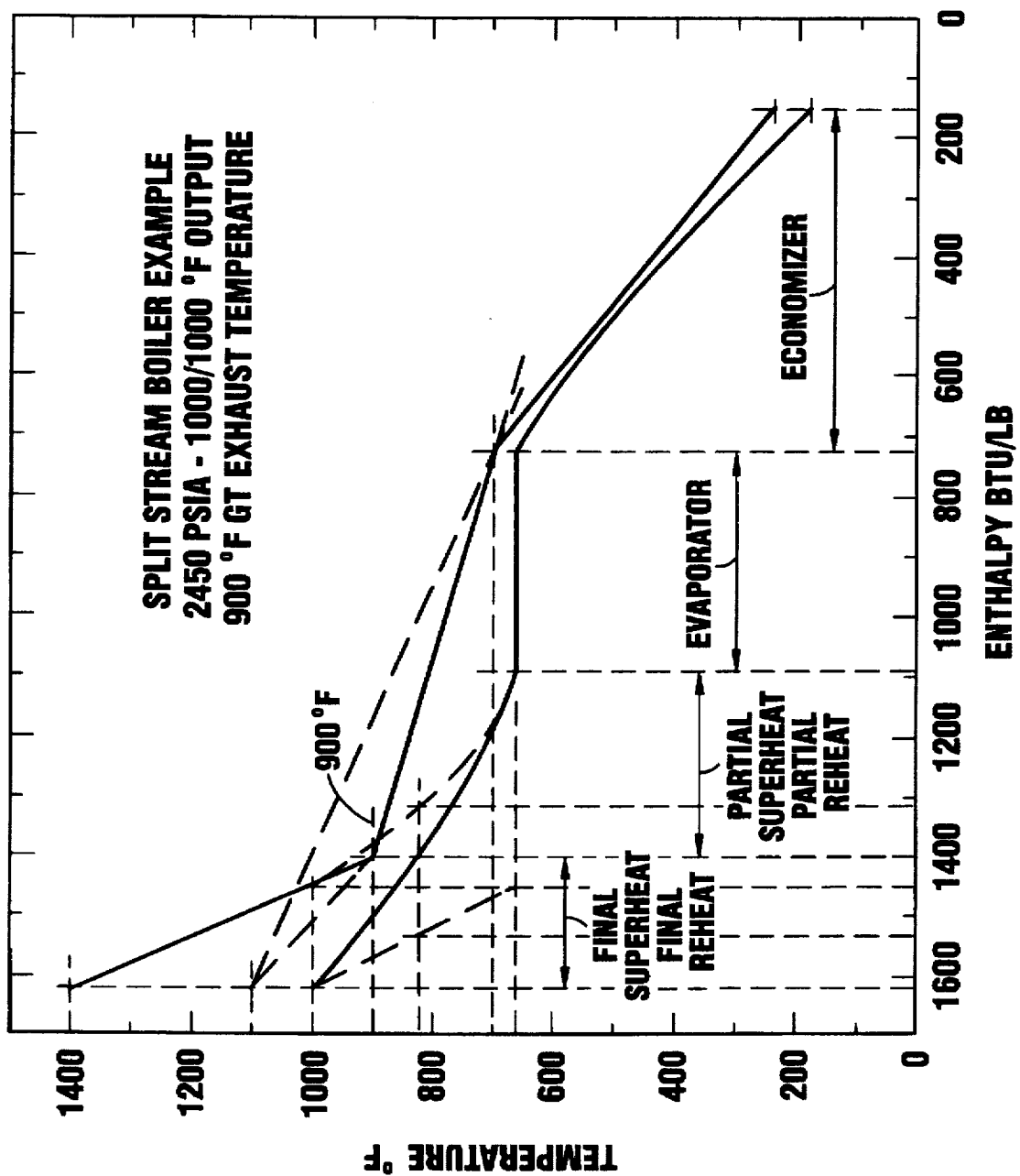
FIG. 13 is a temperature-enthalpy diagram for a gas turbine having a 900° F. exhaust temperature and superheating and reheating to 1000° F. for a conventional reheat steam turbine.

In FIG. 13, steam is partially superheated and partially reheated with gas turbine exhaust streams X and Y and given final superheat and reheat to 1000° F. by superheater 58 wherein a gas turbine exhaust temperature of 900° F. is assumed. This example illustrates how split stream boiler 108 may be applied to a conventional 2400 psig 1000°/1000° F. reheat steam turbine when the gas turbine exhaust temperature is only 900° F. No topping steam turbine is used in this example. The gas turbine exhaust temperature would have to be about 1100° F. for a conventional reheat utility-type steam turbine. Supplementary firing the total gas stream degrades the overall combined cycle efficiency potential. Therefore, repowering could be difficult to justify under these gas turbine conditions.

In this example, the steam is heated to about 825° F. and likewise reheated to 825° F. prior to superheating and reheating in superheater 58. Final heating and reheating to 1000° F. is accomplished by supplementary firing by burner 54 ahead of superheater 58. Superheater 58 gas exit temperature is selected to be 900° F. in this case to match the gas turbine exhaust temperature. FIG. 13 shows the partial superheating and reheating heat loads to 825° F. and the final superheating and reheating loads to 1000° F. The supplementary firing temperature in front of superheater 58 is selected to be 1400° F., as shown, but could be raised to 2500° F. depending on the final cost of the split stream boiler 108 when considering the incremental cost of heat transfer surface, burners, ducts and induced draft fan 174.

FIG. 13 further illustrates how the split stream boiler of the present invention may be incorporated into the presently available coal gas fuel integrated cycle (IGCC). A conventional "F" technology gas turbine having an 1100° F. exhaust temperature exhausts into a reheat heat recovery boiler and superheats and reheats steam from the coal gasifier and that from the heat recovery boiler to about 1000° F., the practical maximum for this exhaust temperature level. When applying the split stream boiler according to the present invention, the steam at 1000° F. from both the coal gasifier portion output and that from the heat recovery boiler output may be further superheated and then reheated to about 1100° F. (which represents the present temperature limit for utility-type reheat steam turbines and boilers, by means of stream X and topping superheater 58. Superheating initial throttle steam to a 1400° F. level may also be accomplished this way, but topping steam turbines and heat recovery boilers for this temperature level are not readily commercially available and are only now undergoing development and testing. Such topping steam to turbines and heat recovery boilers are expected to be available in the next few years.

Figure 14:
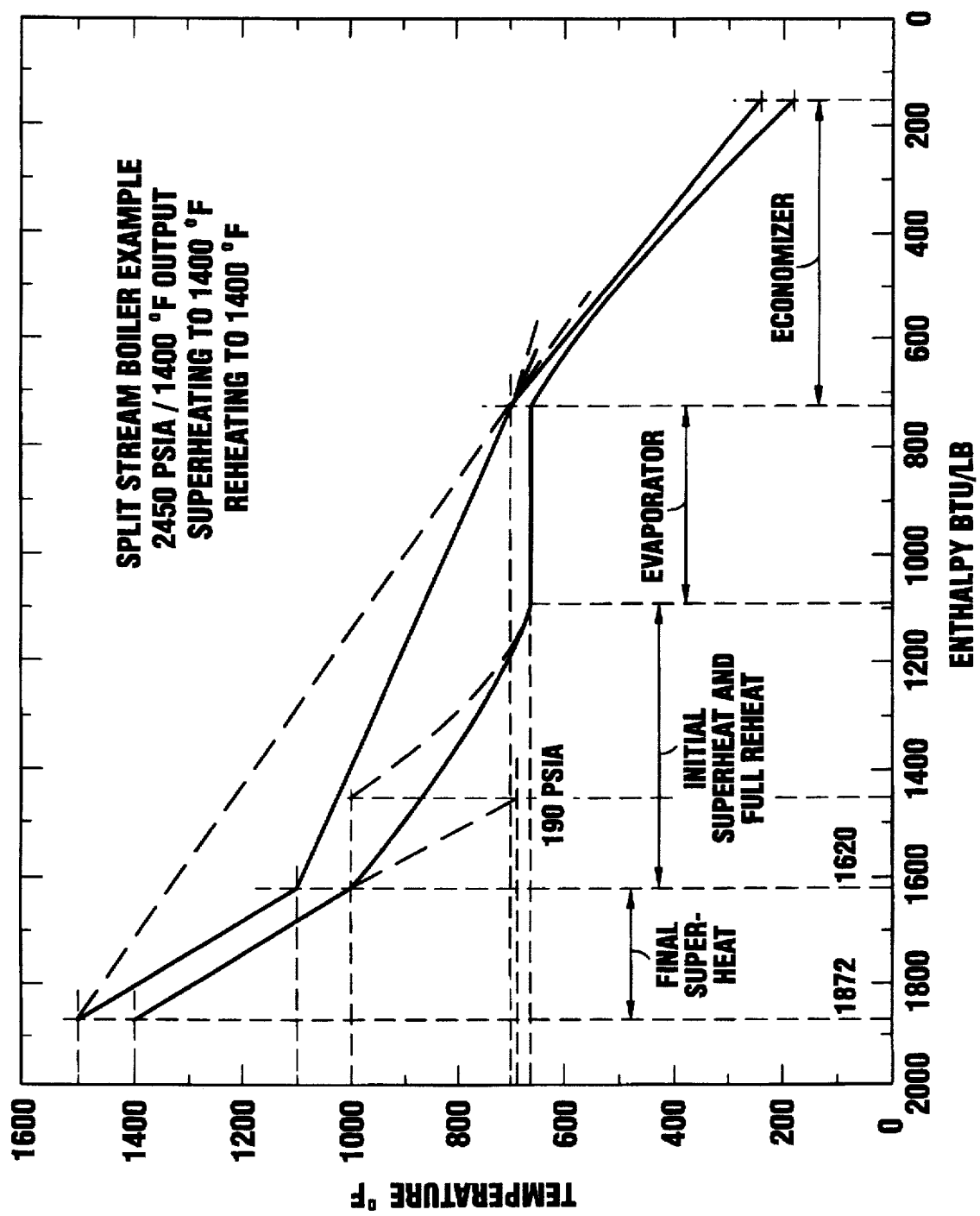
FIG. 14 is a temperature-enthalpy diagram for a gas turbine having an 1100° F. exhaust temperature and superheating 2450 psia steam to 1400° F. and thereafter reheating 190 psia return steam to 1000° F.

In FIG. 14, split stream boiler 108 is applied to a situation where a conventional intermediate pressure turbine 110 and low pressure turbine 112 of a 2400 psig 1000°/1000° F. reheat steam turbine is topped by a high temperature and high pressure topping steam turbine 80, and where a conventional reheat heat recovery boiler is positioned in parallel with split stream boiler 108. A gas turbine exhaust temperature of 1100° F. is selected for "F" class gas turbines currently being sold. The initial throttle steam at 2400 psig is superheated to 1400° F. by topping superheater 58, is expanded to 190 psia in topping turbine 80, is reheated to 1000° F. by gas streams X and Y and is further expanded in steam turbine 116 and then condensed in condenser 114. The 2450 psia steam is partially superheated by the heat recovery steam generator portion of the system to 1000° F. and is then further superheated to 1400° F. by the superheater 58. FIG. 14 shows the final enthalpy heat load required to heat the steam to 1400° F. (incremental 1620h to 1872h).

The supplemental firing temperature in front of the superheater 58 may be increased from the 1500° F. as shown in FIG. 14 up to 2500° F. or even higher, and the bypass gas flow (stream X) may be reduced without any effect on combined cycle efficiency, as previously explained. This option is a designer's choice to be based on overall cost of split stream boiler 108 and the conventional reheat heat recovery boiler, both operating in parallel.

The 190 psia exit pressure to reheater sections 184 and 186 is lower than normal for reheat steam turbines. This pressure may be increased by selecting a supercritical throttle pressure or by exhausting from the high pressure section of the steam turbine at a higher than normal temperature. Again, overall cost of the different arrangements would have to be evaluated.

Figure 15:
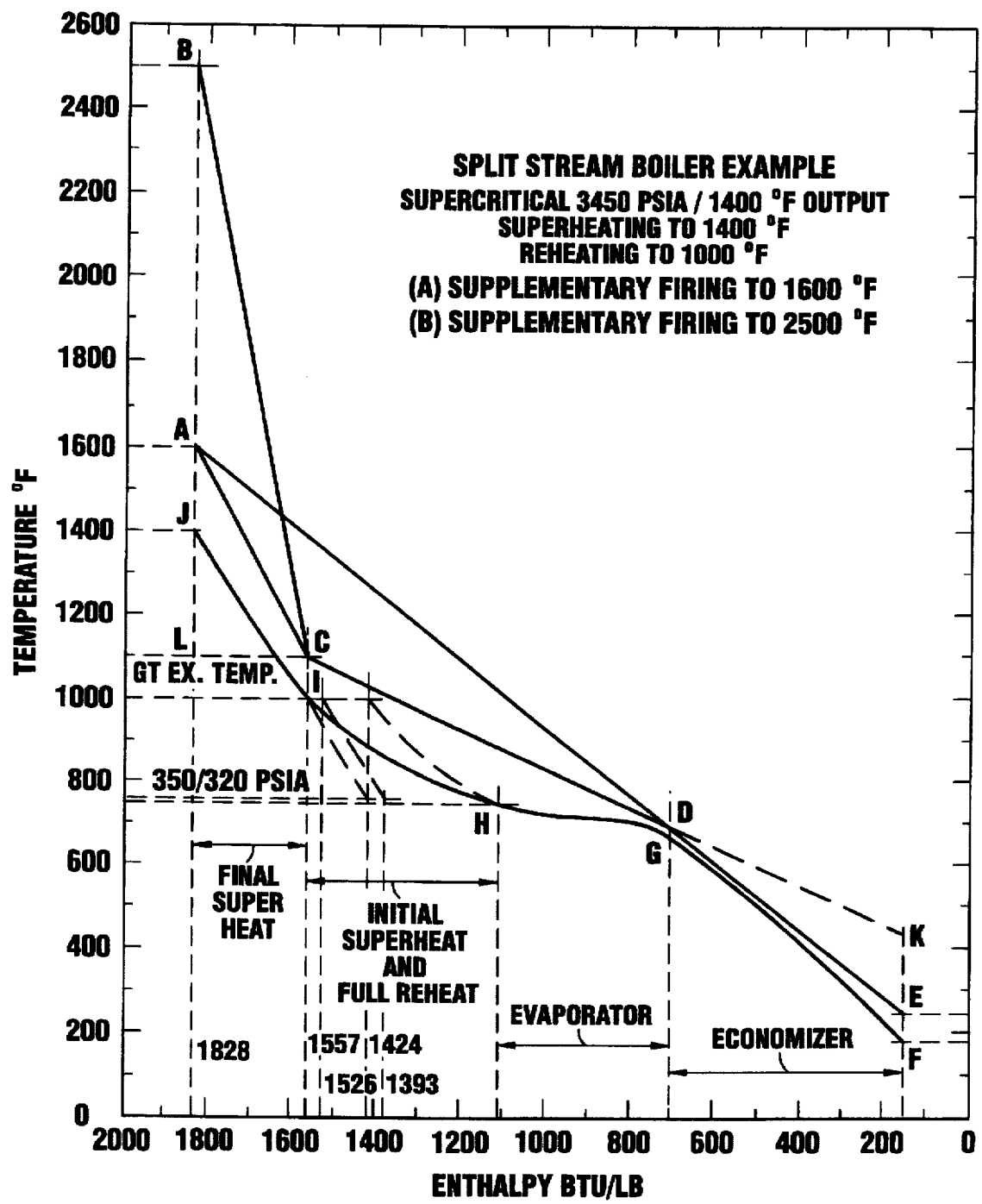
FIG. 15 is a temperature-enthalpy diagram for a gas turbine exhausting at 1100° F. and superheating supercritical 3450 psia steam to 1400° F. and thereafter reheating return steam at 350 psia to 1000° F.

In FIG. 15, a supercritical pressure of 3450 psia is selected with steam superheating to 1400° F. and reheating to 1000°

F. A gas turbine exhaust temperature of 1100° F. is assumed to match the exhaust temperature level of the "F" class gas turbines currently being sold. The topping steam turbine 80 exhausts at 350 psia, as shown. The enthalpy reheat heat load for reheating to 1000° F. is added to the heat load of the heat recovery boiler and split stream boiler operating in parallel as shown (1343h to 1526h). The enthalpy heat load of topping superheater 80 is indicated in FIG. 15 (incremental 1557h to 1828h). Gas stream X may be supplementary fired to 1600° F. or as high as 2500° F., as shown in FIG. 15, to reduce gas stream X flow and increase temperature differentials between the steam and gas. The induced draft fan 174 will be smaller, and the conventional heat recovery boiler will become larger to make up for the smaller split stream boiler sections downstream of superheater 58.

The supercritical pressure coupled with split stream boiler 108 and topping steam turbine 80 makes it possible to obtain an incremental combined cycle efficiency gain of 3 to 4 percentage points over the conventional reheat heat recovery boiler and reheat steam turbine.

7. Fuel Gas Chemical Recuperation

Figure 16:
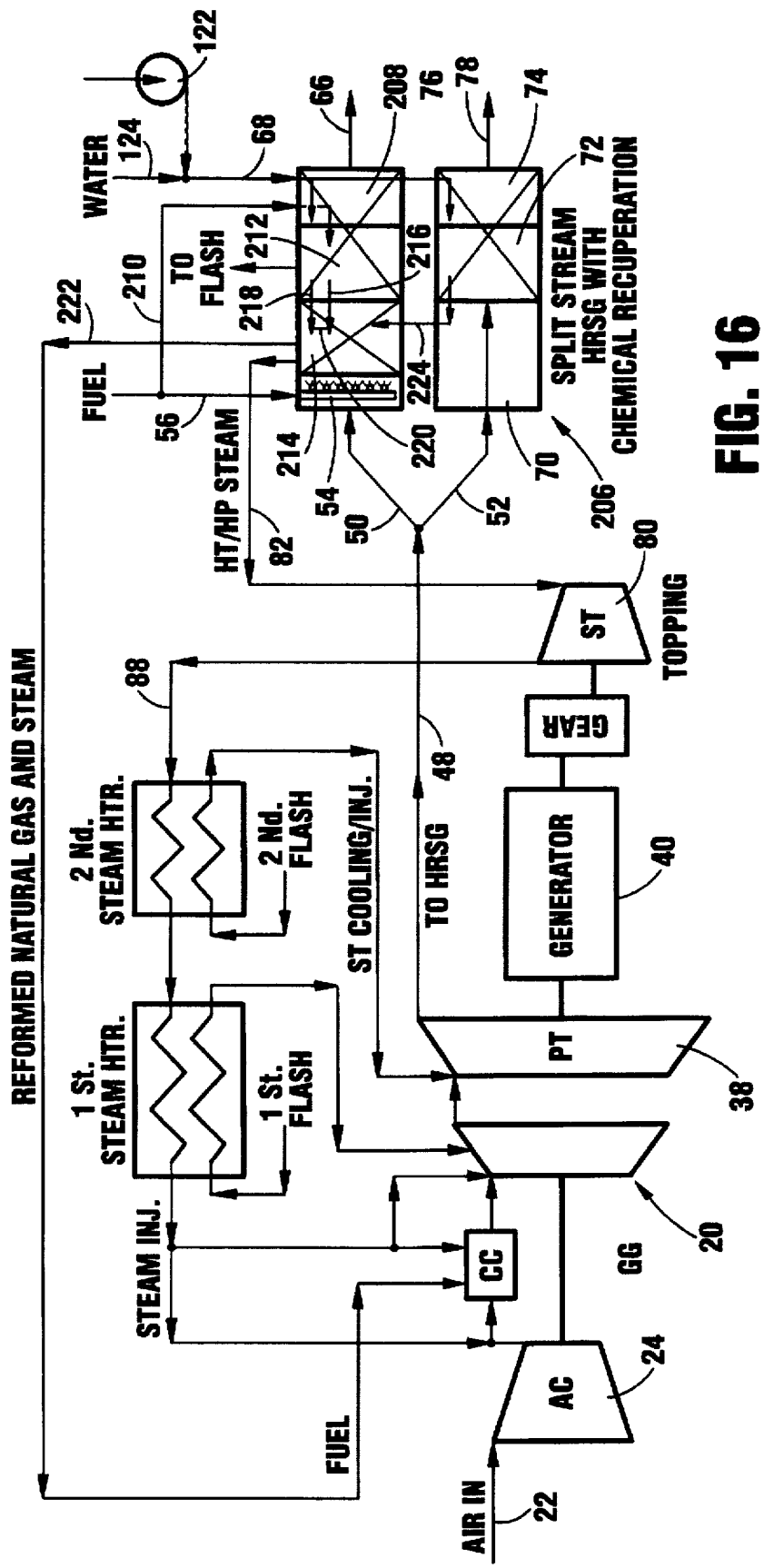
FIG. 16 is a schematic flow diagram of a steam-injected gas turbine exhausting into a split stream boiler that incorporates chemical recuperation.

In FIG. 16, the split stream boiler as discussed above includes the concept of the split stream boiler being modified and designed to include hydrocarbon fuel gas chemical recuperation. Natural gas, predominantly methane, is currently the preferred fuel gas. In this new split stream boiler and fuel gas reformer 206 arrangement, natural gas enters combined water economizer and natural gas heater 208 through line 210, is heated by heat exchange surface contained in heater 208 and is further heated in combined water evaporator and natural gas heater 212 before being discharged to combined steam superheater and reformer 214 through line 216. Steam from line 218 is mixed with heated natural gas in line mixer 220. Water is pumped by pump 122 and enters heater 208 through line 68 and flows through heat exchange surface of sections 208 and 212 to superheater and reformer 214 through line 218. Heated steam leaves combined heater 214 as a highly heated mixture of steam and reformed natural gas through line 222.

The heated steam and natural gas mixture is heated to a high temperature up to 1500° F. in the presence of a catalyst to form reformed fuel gas. This high temperature yields a high amount of hydrogen, which is desirable without supplementary firing the full exhaust gas flow of combined gas streams X and Y, which causes combined cycle efficiency degradation. Gas turbine exhaust stream X from duct 50 is supplementary fired to a temperature of 1400° F. to 2500° F. by duct burner 54 by fuel entering burner 54 through line 56. Steam produced from gas flow Y from duct 52 is likewise superheated to any desired temperature level in parallel with the reformed natural gas and steam mixture in heater 214 entering through line 224. Steam produced from gas flow Y may supplement the steam produced from gas stream X for fuel gas reforming, if desired. Steam produced by gas flow Y may be optionally heated to a level of 1500° F. and then fed to topping steam turbine 80 through line 82. However, the steam initially need not be superheated to this high temperature and may be given final superheat by cooling the 1400° F. to 1500° F. reformed fuel by heaters 90 and 92. A more manageable fuel gas temperature to the gas turbine is obtained when considering the required gas stop valve and gas control valve design and material limitations.

Figure 17:
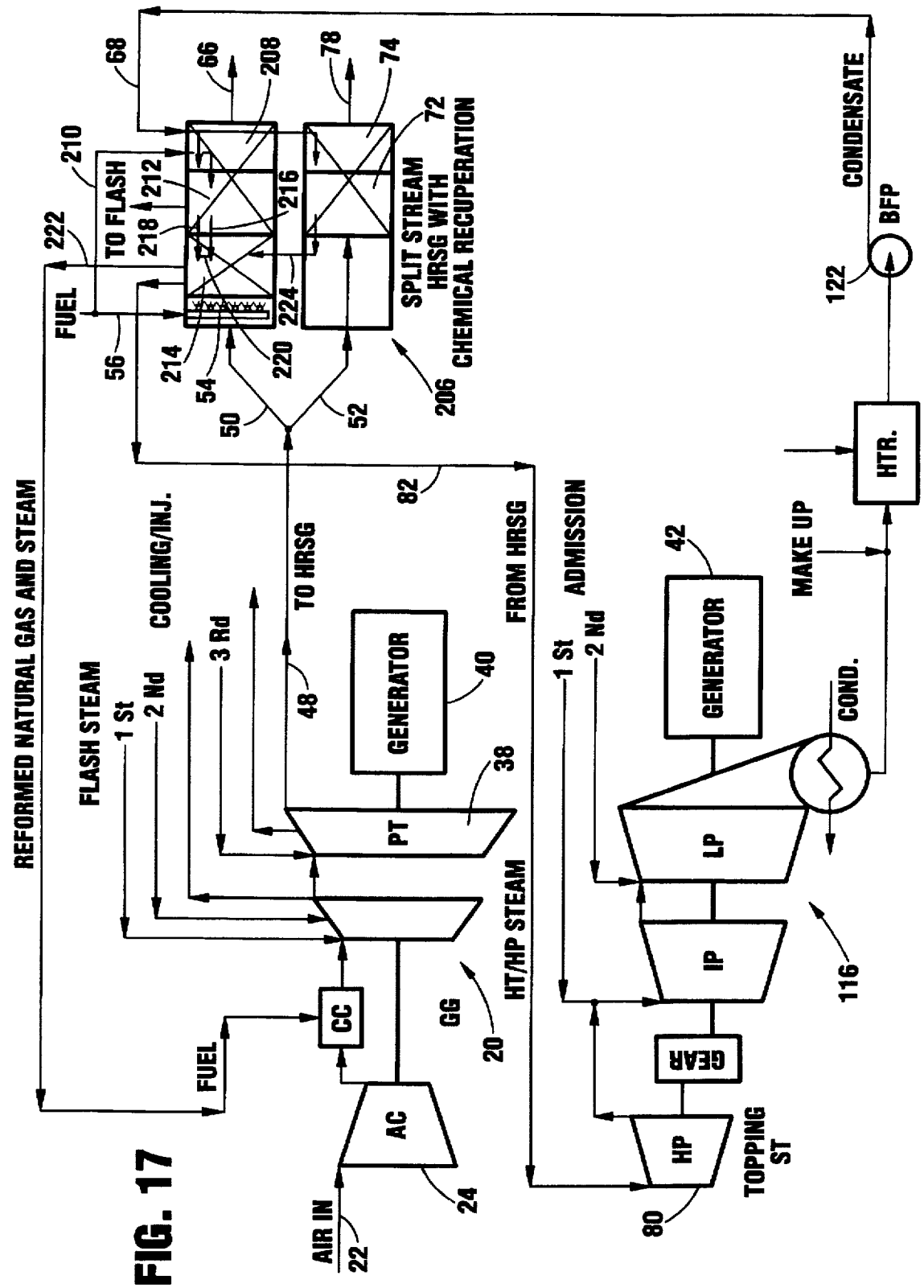
FIG. 17 is a schematic flow diagram of a gas turbine exhausting into a split stream boiler that incorporates chemical recuperation, a topping steam turbine and a condensing steam turbine.

The rest of the steam-injected combined cycle shown in FIG. 16 operates the same as explained for FIG. 1. Note that no boiler drums are shown in FIGS. 16 and 17 but optionally may be incorporated. Likewise, a once through boiler design may be used.

In FIG. 17, for the condensing steam turbine combined cycle, combined split stream boiler and fuel gas reformer 206 operates in the same manner as explained for FIG. 16 and the previous operation of FIGS. 1 and 2. The same advantages are cited for the arrangement shown in FIG. 17 as for FIG. 16. The fuel gas reformer process is integrated with the split stream boiler 108 apparatus to form a new and different steam generation, steam superheating and fuel gas reforming process of equipment 206.

Combined split stream boiler and reformer/recuperator 206 of FIGS. 16 and 17 may incorporate a number of desirable features. The boiler feed pump 122 may be of a dual outlet pressure design or two separate units. The high pressure output may feed gas stream Y path for topping steam turbine 80 and the low pressure output may feed gas stream X path for fuel reforming (and steam superheating) and subsequent burning in the gas turbine 20. Also, the optimum amount of lower pressure steam may be generated by stream path X to match the desired steam to natural gas weight and/or volume ratio for optimum gas reforming. The supplementary burner 54 may be modulated to provide the proper gas path X temperature to superheater and reformer section 214 for reforming and superheating. The heat transfer surface for gas path streams X and Y should be properly sized to accomplish the desired results.

The foregoing is considered as illustrative only of the principles of the invention. Since numerous modifications and changes will readily occur to those skilled in the art, it is not desired to limit the invention to the exact construction and operation shown and described. Accordingly, all suitable modifications and equivalents falling within the scope of the invention may be resorted to. Similarly, as the state of the art of gas turbines, stream turbines, heat recovery boilers and hydrocarbon reformers advances through improved higher temperatures and higher efficiency, the general relationships presented heretofore fall within the scope of the invention.

What is claimed is:

1. A gas stream heat recovery boiler for recovering heat exhaust from at least one combustion gas turbine to drive a load, comprising:

at least one air compressor;

at least one combustor receiving air provided by said at least one compressor;

at least one gas expansion turbine for expanding gas provided by said at least one combustor and for providing first and second separate exhaust gas streams flowing downstream through first and second steam generators, each steam generator having at least one economizer for heating water provided by a water source and at least one evaporator for converting water to steam;

a supplementary fired superheater upstream of the first steam generator, the first exhaust gas stream passing through the supplementary fired superheater, then through the first steam generator; and the second exhaust gas stream bypassing the supplementary fired superheater, then passing through the second steam generator, the first and second steam generators configured such that steam flow generated by the first steam generator is combined with steam flow generated by the second steam generator, such that the temperature of the steam produced by the first and second steam generators is increased by heat from the supplementary fired superheater.

2. The boiler as defined in claim 1, wherein a damper automatically controls flow in the first gas stream by varying back pressure.

3. The boiler as defined in claim 1, wherein a damper controls flow of the second gas stream.

4. The boiler as defined in claim 1, further comprising:
an induced draft fan for controlling the flow rate of the first gas stream.

5. The boiler as defined in claim 1, further comprising:
first and second substantially rectilinear-shaped exhaust gas flow chambers within the boiler for transmitting the first and second gas streams, respectively, through the boiler.

6. The boiler as defined in claim 5, further comprising:
an isolation wall for separating the first and second substantially rectilinear-shaped chambers.

7. The boiler as defined in claim 1, further comprising:
first and second substantially annular-shaped chambers within the boiler for transmitting the first and second gas streams, respectively, through the boiler.

8. The boiler as defined in claim 1, further comprising:
first and second flow chambers within the boiler for transmitting the respective first and second gas streams through the boiler in a generally vertical gas flow arrangement.

9. The boiler as defined in claim 1, further comprising:
first and second flow chambers within the boiler for transmitting the respective first and second gas streams through the boiler in a generally horizontal gas flow arrangement.

10. The boiler as defined in claim 1, further comprising:
an initial superheater for partially superheating steam with heat from the first and second gas streams; and
a supplementary fired superheater for further heating the first gas stream.

11. The boiler as defined in claim 1, wherein the first gas stream is heated by a burner within the supplementary fired superheater to a temperature of from 1400° F. to 1600° F.

12. The boiler as defined in claim 1, wherein the first gas stream is heated by a burner within the supplementary fired superheater to a temperature of from 2400° F. to 2600° F.

13. The boiler as defined in claim 1 further comprising means for controlling the flow of at least one of the two separate gas streams.

14. The boiler as defined in claim 13 wherein the means for controlling the flow of at least one of the two separate gas streams comprises at least one damper.

15. The boiler of claim 1 in which the temperature of the first gas stream leaving the supplementary fired superheater is about the same temperature as the temperature of the first gas stream provided by the gas turbine.

16. A process for generating superheated steam from exhaust heat from at least one combustion gas turbine to drive a load, the process comprising:
providing first and second separate exhaust gas streams from said at least one combustion gas turbine;
positioning a supplementary fired superheater and s first steam generator having a first economizer for heating a source of water and generating steam along the first exhaust gas stream;
positioning a second steam generator having a second economizer for heating a source of water and generating steam along the second exhaust gas stream;
while generating steam in said first steam generator and in said second steam generator, increasing the temperature of said first gas stream by supplementary firing fuel upstream of said supplementary fired superheater;
superheating the steam generated by said first steam generator and said second steam generator in said supplementary fired superheater by extracting heat from supplementary fired fuel burned in said first gas stream wherein said steam generated by said first steam generator and said second steam generator is combined and said steam is heated by the supplementary fired superheater; and
discharging superheated steam from said supplementary fired superheater.

17. The process of claim 16 in which the temperature of the first gas stream leaving the supplementary fired superheater is about the same temperature as that of the first gas stream provided by the gas turbine.

18. The process of claim 16 additionally comprising the step of controlling the gas flow rate of the first and second gas streams.

19. The process of claim 16 wherein the step of generating steam in the first and second steam generators comprises heating water at an elevated pressure in the first economizer and the second economizer to a temperature sufficient to provide saturated steam.

20. The process of claim 19, additionally comprising the step of flashing the high pressure heated water to provide a lower pressure saturated steam.

21. The process of claim 20 additionally comprising the step of ducting the lower pressure saturated steam to said gas turbine for injection therein.

22. The process of claim 21, additionally comprising the step of heating the lower pressure saturated steam before injection into the gas turbine.

23. The process of claim 20, wherein the step of flashing the high pressure heated water provides leftover condensate, which is then combined with water fed to the first and second economizers.

24. The process of claim 23, wherein gas turbine fuel is provided to the gas turbine, additionally comprising the step of heating the gas turbine fuel with heat from at least a portion of the leftover condensate.

25. The process of claim 16 additionally comprising the step of reducing the temperature of the first and second gas streams to the minimum stack temperature.

* * * * *